US008335515B2

(12) United States Patent
Goerke et al.

(10) Patent No.: US 8,335,515 B2
(45) Date of Patent: Dec. 18, 2012

(54) RADIO NETWORK ASSIGNMENT AND ACCESS SYSTEM

(75) Inventors: Thomas Earle Goerke, Attadale (AU); Richard Harold Hammersla, Vermont (AU); Nicholas Richard Hart, Hallett Cove (AU); Christopher Boyce Meulman, North Turramurra (AU); Nicholas Antony Cirillo, Singapore (SG)

(73) Assignee: Thiss Technologies Pte Ltd, Singapore (SG)

( * ) Notice: Subject to any disclaimer, the term of this patent is extended or adjusted under 35 U.S.C. 154(b) by 0 days.

(21) Appl. No.: 13/416,593

(22) Filed: Mar. 9, 2012

(65) Prior Publication Data

US 2012/0230300 A1 Sep. 13, 2012

Related U.S. Application Data

(62) Division of application No. 10/554,125, filed as application No. PCT/AU2004/000529 on Apr. 22, 2004, now abandoned.

(30) Foreign Application Priority Data

Apr. 23, 2003 (AU) ................................. 2003901931

(51) Int. Cl.
*H04W 4/00* (2009.01)
*H04W 72/00* (2009.01)
*H04B 7/00* (2006.01)
*H04B 7/185* (2006.01)

(52) U.S. Cl. .............. 455/452.1; 455/427; 455/516; 455/12.1

(58) Field of Classification Search .......... 455/12.1, 455/450–452.1, 516, 3.02, 427–428, 464, 455/509
See application file for complete search history.

(56) References Cited

U.S. PATENT DOCUMENTS

| 4,455,651 | A |   | 6/1984  | Baran            |          |
|-----------|---|---|---------|------------------|----------|
| RE32,905  | E |   | 4/1989  | Baran            |          |
| 5,053,782 | A |   | 10/1991 | Levinberg et al. |          |
| 5,152,012 | A | * | 9/1992  | Schwob           | 455/158.5 |
| 5,497,505 | A |   | 3/1996  | Koohgoli et al.  |          |
| 5,774,805 | A |   | 6/1998  | Zicker           |          |
| 5,978,368 | A |   | 11/1999 | Hjelm et al.     |          |
| 6,097,706 | A |   | 8/2000  | Fielding et al.  |          |

(Continued)

FOREIGN PATENT DOCUMENTS

AU 200301931 5/2004

(Continued)

OTHER PUBLICATIONS

Claims as filed in Application No. PCT/AU2004/000529 (2004).

(Continued)

*Primary Examiner* — Wesley Kim
(74) *Attorney, Agent, or Firm* — Fish & Richardson P.C.

(57) ABSTRACT

A communications system includes remote stations coupled to a central station by a network. The system includes the network, the central station establishes a list of information about available network resources and publishes the list for the remote station. The system includes the remote stations, which identify a set of said published resources needed to establish the connection, notify the central station about the identified resources, and seize the set of identified resources to thereby establish the connection. The central station updates the list of available resources to thereby reflect the seizing of the set, and communicates the updated list to the remote stations.

28 Claims, 22 Drawing Sheets

U.S. PATENT DOCUMENTS

| | | | |
|---|---|---|---|
| 6,134,445 A | 10/2000 | Gould et al. | |
| 6,151,512 A | 11/2000 | Chheda et al. | |
| 6,233,429 B1 | 5/2001 | Soffer et al. | |
| 6,259,917 B1* | 7/2001 | Elzein | 455/435.2 |
| 6,374,100 B1* | 4/2002 | Smith et al. | 455/419 |
| 6,438,376 B1 | 8/2002 | Elliott et al. | |
| 6,449,267 B1 | 9/2002 | Connors | |
| 6,529,740 B1* | 3/2003 | Ganucheau et al. | 455/519 |
| 6,539,003 B1 | 3/2003 | Agarwal et al. | |
| 7,127,256 B2 | 10/2006 | Terry et al. | |
| 7,292,203 B2 | 11/2007 | Craggs et al. | |
| 7,483,672 B2 | 1/2009 | Hart et al. | |
| 2001/0046868 A1* | 11/2001 | Liu et al. | 455/452 |
| 2003/0060224 A1 | 3/2003 | Nelson et al. | |
| 2004/0192200 A1* | 9/2004 | Karabinis et al. | 455/12.1 |
| 2004/0193706 A1 | 9/2004 | Willoughby et al. | |
| 2004/0203824 A1* | 10/2004 | Mock et al. | 455/452.1 |

FOREIGN PATENT DOCUMENTS

| | | |
|---|---|---|
| EP | 0 658 997 | 6/1995 |
| EP | 0 817 521 | 1/1998 |
| EP | 1 113 591 | 7/2001 |
| EP | 1 616 449 | 4/2004 |
| GB | 2326311 | 12/1998 |
| GB | 2377343 | 1/2003 |
| WO | WO88/04497 | 6/1988 |
| WO | WO01/03459 | 11/2001 |
| WO | WO03/046603 | 6/2003 |
| WO | WO2004/095867 | 11/2004 |

OTHER PUBLICATIONS

Reply to Action in NZ Application No. 543129, dated Dec. 6, 2007.
Reply to Action in EP Application No. 04728740.4, dated Feb. 27, 2008.
Examination Report in Australian Application No. 2004231937, dated Nov. 7, 2008.
Examination Report in Singapore Application No. 200506754-1, dated Nov. 14, 2007.
Examination Report in New Zealand Application No. 543129, dated Sep. 1, 2006.
Examination Report in New Zealand Application No. 543129, dated Jan. 17, 2008.
Notice of Acceptance in New Zealand Application No. 543129, dated Feb. 11, 2008.
International Preliminary Report on Patentability in Application No. PCT/AU2004/000529, dated Oct. 28, 2005 (includes Written Opinion dated Jun. 21, 2004).
Claims from Issued NZ Patent No. 543129 (Dec. 2007).
International Search Report in Application No. PCT/AU2004/000529, dated Jun. 21, 2004.
Response to Examination Report filed on Apr. 7, 2010 in Australian Application No. 2004231937.
Deed of Letters Patent dated Sep. 23, 2010, in Australian Application No. 2004231937.
Notice of Acceptance dated May 28, 2010, in Australian Application No. 2004231937.
File History for EP Application No. 04728740.4, as retrieved from EPO (http://ep.espacenet.com) on Mar. 11, 2010.
Decision to Grant issued in EP Application No. 04728740.4, dated Jul. 16, 2009.
Communication from EPO in Application No. 04728740.4, dated Feb. 9, 2009.
Communication from EPO in Application No. 04728740.4, dated Aug. 20, 2007.
Supplemental Search Report in EP Application No. 04728740.4, dated Feb. 26, 2007.
Dinh et al., "Technical development for Australia's MOBILESAT system", [online] Retrieved from the Internet: <URL:http://74.125.47.132/search?q=cache:nVNFE5EcHT4J:ntrs.nasa.gov/details.jsp%3FR%3D605353+AUSSAT+%22Harrison%22&cd=27&hl=en&ct=clnk&gl=us> [retrieved on Mar. 11, 2010] (1990).
Harrison et al., "Network Management Stations for Australia's MobileSat System", 14th AIAA Int'l Communications Conf., (Mar. 22-26, 1992), Washington, D.C.
Abramson, N., "Internet Access Using VSATs", IEEE Communications Magazine (Jul. 2000).
Ubiquity Software Corporation, White Paper "Understanding SIP: Today's Hottest Communications Protocol Comes of Age", [online] Retrieved from the Internet<URL:http://wahtel.com/Documents/VOIP/UnderstandSIP_WP_072203.pdf>, [retrieved on Mar. 11, 2010] ((c) 2003).
Sisalem et al., "Understanding SIP", [online] Mobile Integrated Services GMD Fokus, Retrieved from the Internet<URL: http://www.swen.uwaterloo.ca/~kostas/ECE355-05/tutorials/SIP-basics.pdf>, (2001).
U.S. Appl. No. 60/457,118 (Karabinis), filed Mar. 24, 2003.
U.S. Appl. No. 60/457,043 (Karabinis), filed Mar. 24, 2003.

* cited by examiner

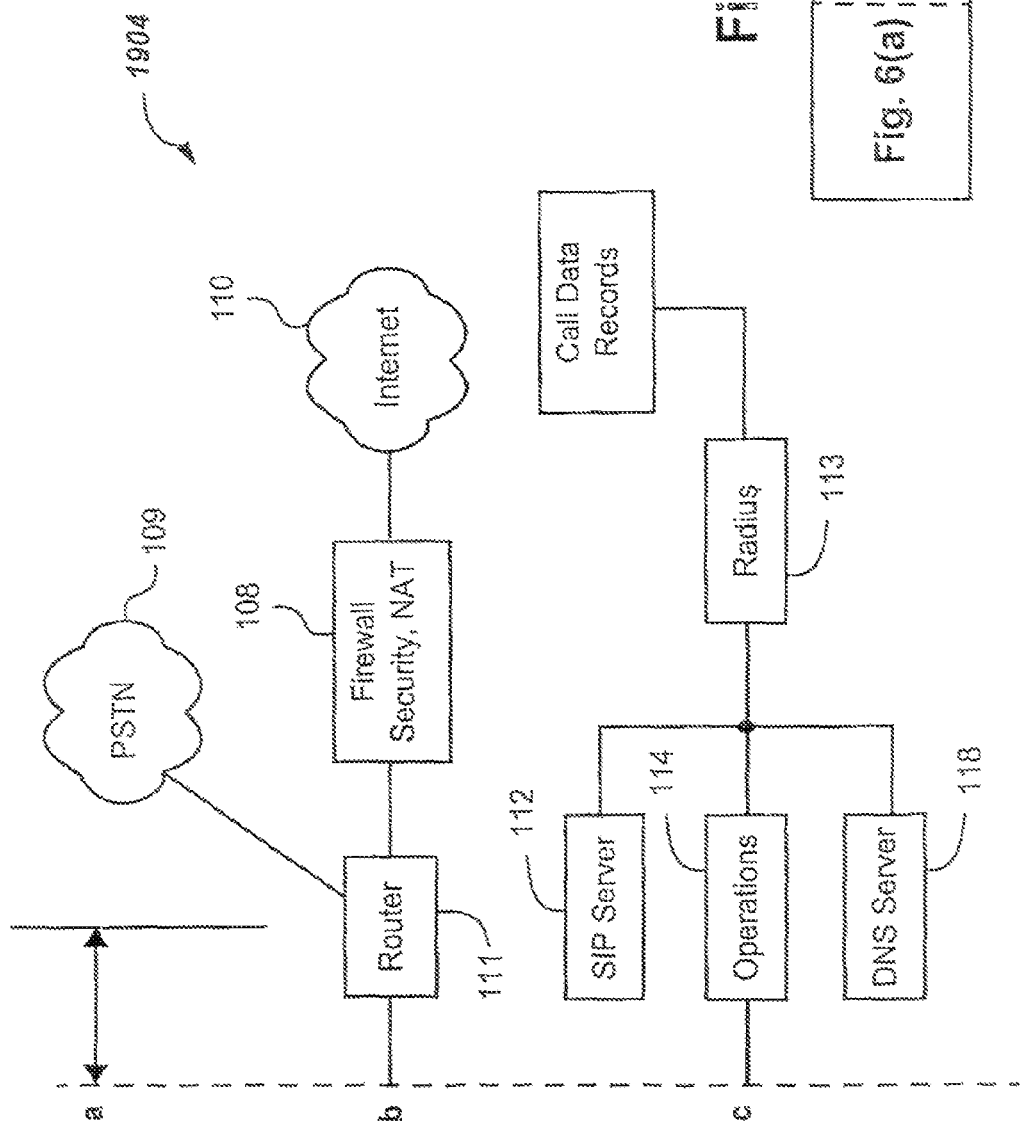

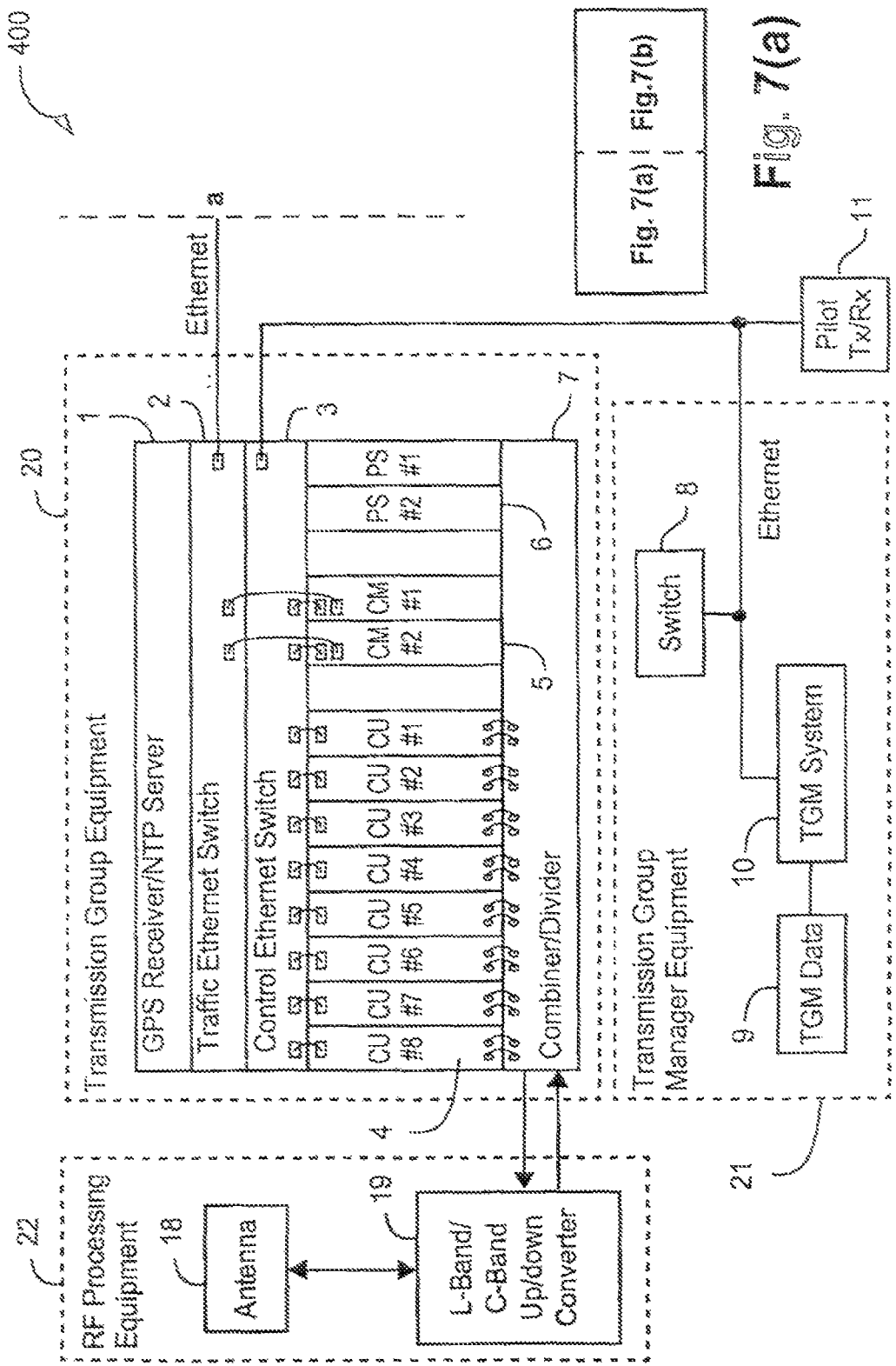

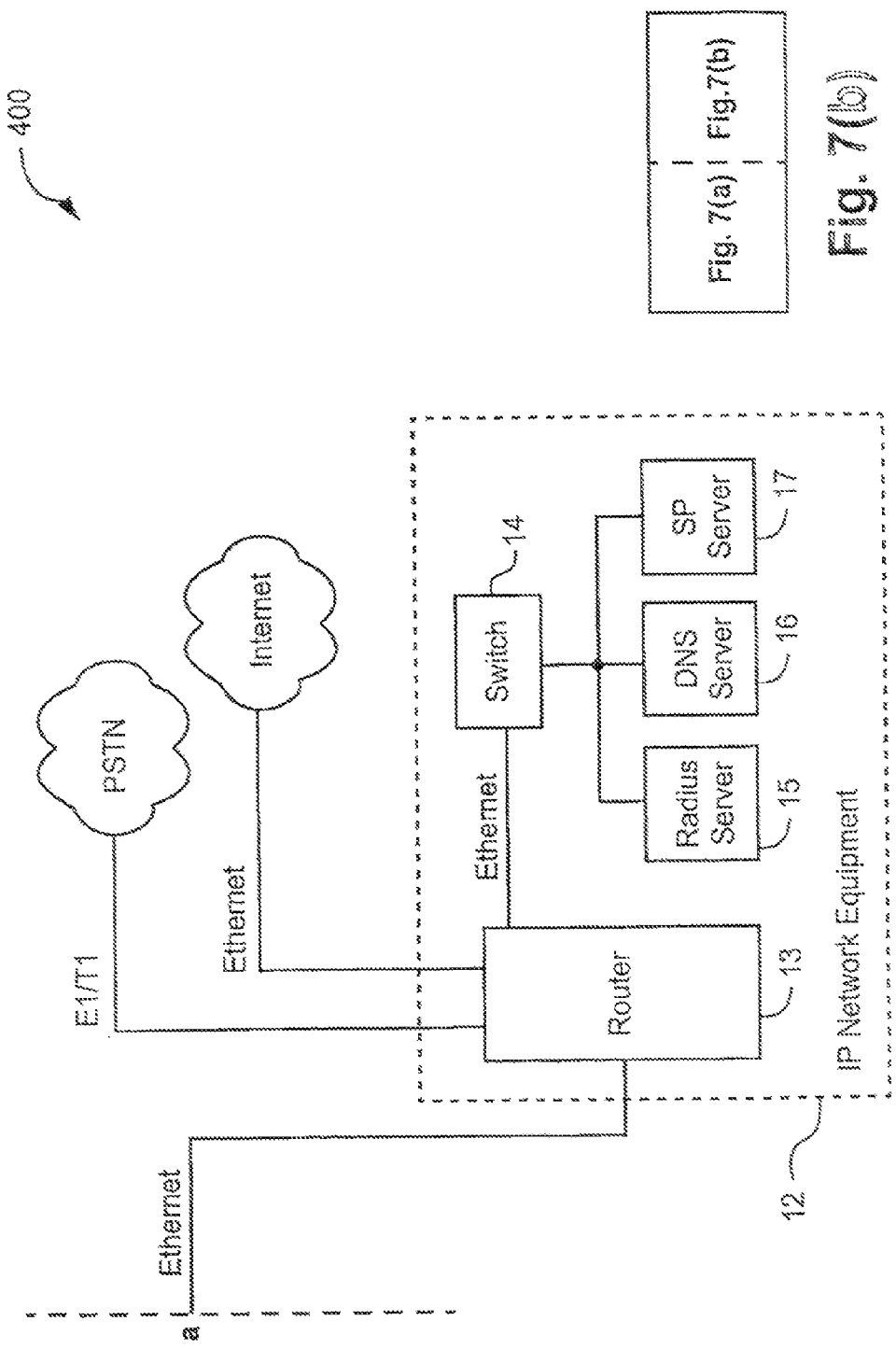

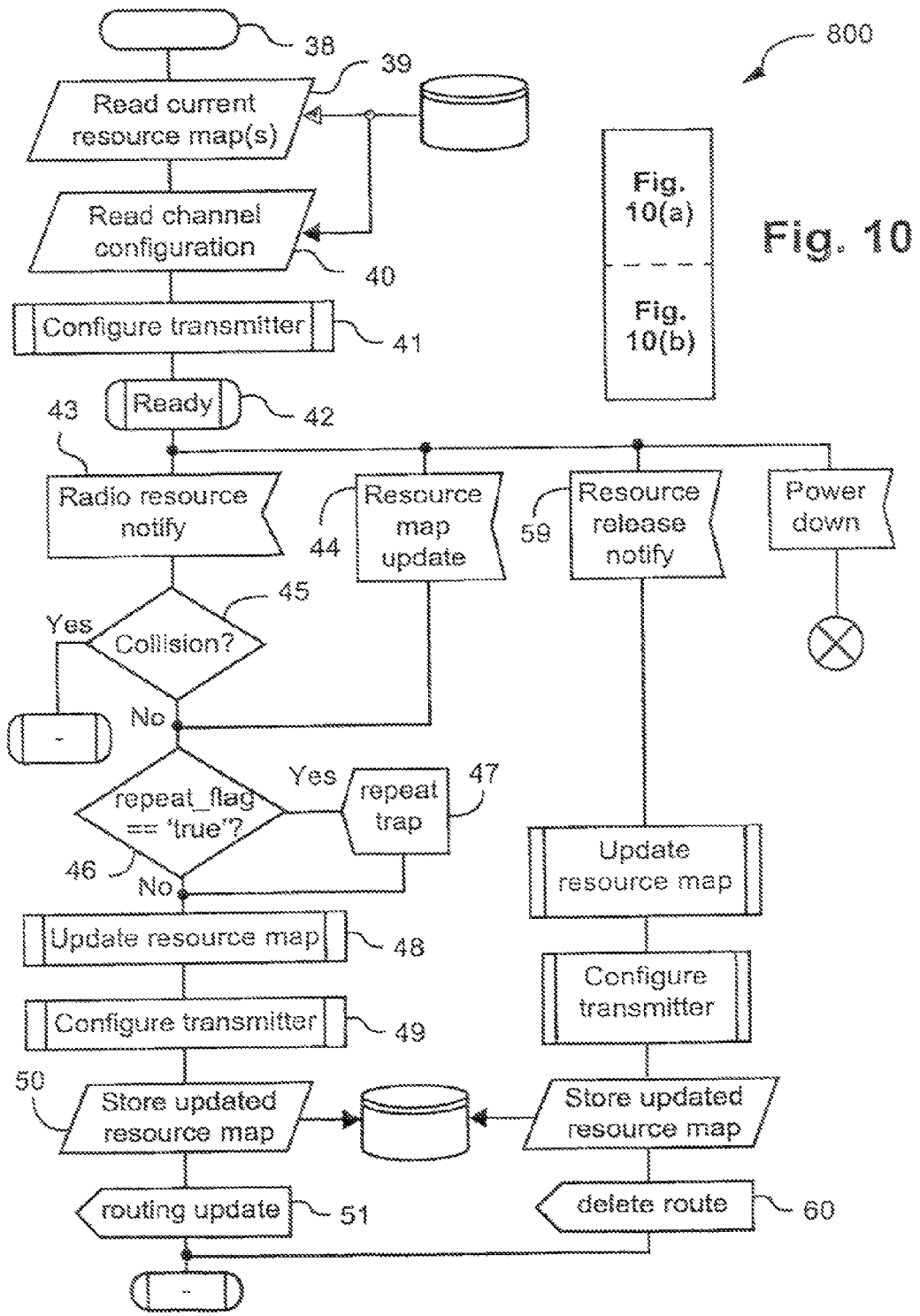

| Fig. 13(a) | Fig. 13(b) | Fig. 13(c) |

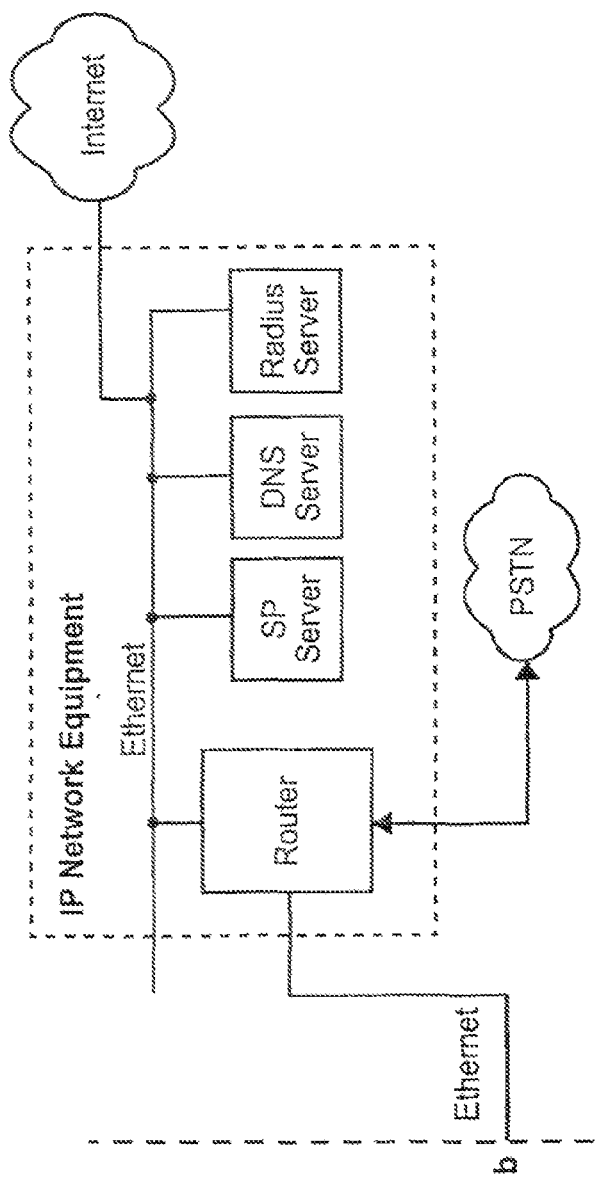
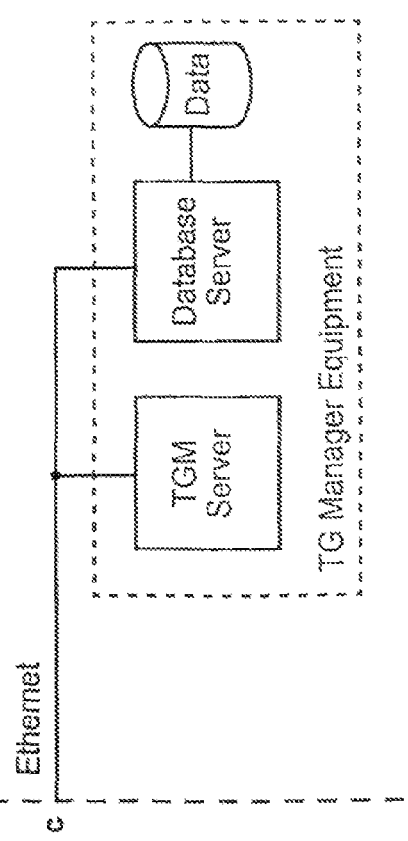
Fig. 13(c)

RADIO NETWORK ASSIGNMENT AND ACCESS SYSTEM

CROSS-REFERENCE TO RELATED APPLICATIONS

This is a divisional of U.S. application Ser. No. 10/554,125 filed. Jul. 12, 2006, which claims the benefit of priority to WIPO Application Serial No. PCT/AU2004/000529 filed Apr. 22, 2004, which claims the benefit of priority to AU Application Serial No. 2003901931 filed Apr. 23, 2003. All subject matter set forth in U.S. application Ser. No. 10/554, 125, WIPO Application Serial No. PCT/AU2004/000529, and AU Application Serial No. 2003901931 is hereby incorporated by reference into the present application as if fully set forth herein.

FIELD OF THE INVENTION

The present invention relates generally to radio networks, and particularly to resource assignment in such systems.

BACKGROUND

In radio networks a general system requirement is the management and allocation of "a pool" of radio channels between multiple radio remote stations, as users require access for a specific service. This allows the network to support a very large number of remote stations, which are allocated shared radio circuits on demand for the period of time that the user requires that service. This is termed a Demand Assigned Multiple Access (DANA) communication network. This management and allocation of radio channels has typically been performed using a centralised management process (computer system) located within the network.

The aforementioned networks typically provide for a combination of signalling channels for the establishment and clear down of specific radio communication channels between user and central station and communication channels over which the actual user data or service traffic is transmitted. These signalling channels are typically a combination of both dedicated out of band signalling channels using dedicated radio channels, or in-band signalling where signalling is integrated with the actual channel that has been allocated for the transfer of the user data.

The management of these signalling channels, and the allocation of radio bearers is critical to the operation of the radio network and requires complex, dedicated equipment often implemented in redundant configurations at great expense, which performs these critical network management aspects.

In satellite networks this is specifically complicated, as large numbers of users will be sharing a small number of communication channels. For example, mobile satellite networks such as Inmarsat, and Domestic satellite operators typically use complex redundant computer systems to provide centralized facilities for the allocation of channels using specific radio frequencies.

SUMMARY

It is an object of the present invention to substantially overcome, or at least ameliorate, one or more disadvantages of existing arrangements.

Disclosed are arrangements, generally referred to as 'distributed resource allocation' or 'distributed resource management' arrangements, which seek to address the above problems by enabling remote stations to seize required network resources, from a pseudo-real-time published list of available network resources, and to notify a central station that the resources have been seized. The central station consequently updates the available resource list and publishes the updated list for all remote stations.

The disclosed distributed resource management arrangements provide an efficient multiple access communication network that does not depend upon a complex centralised radio network management facility to manage the shared radio network resource.

According to a first aspect of the present invention, there is provided a method of establishing a connection in a system in which a remote station is coupled to a central station by a network, the method comprising the steps of:

establishing, by the central station, a list of information about available network resources;

publishing, by the central station, the list for said remote station;

identifying, by said remote station, a set of said published resources needed to establish the connection;

notifying, by said remote station, the central station about the identified resources;

seizing, by said remote station, the set of identified resources to thereby establish the connection;

updating, by the central station, said list of available resources to thereby reflect the seizing of said set; and communicating, by the central station, the updated list to said remote station.

According to another aspect of the present invention, there is provided a method of allocating resources by a central station in a system in which a remote station is coupled to the central station by a network, the method comprising the steps of:

establishing, by the central station, a list of information about available network resources;

publishing, by the central station, the list for said remote station; whereby when the remote station sends a notification regarding the seizing, by the remote station, of a set of resources in the list to the central station, the method comprises the further steps of:

updating, by the central station, said list of available resources to thereby reflect the seizing of said set; and communicating, by the central station, the updated list to said remote station.

According to another aspect of the present invention, there is provided a method of obtaining resources, by a remote station, in a system in which the remote station is coupled to a central station by a network, and wherein the central station performs the steps of establishing a list of information about available network resources, and publishing the list for said remote station; the method comprising, in regard to the remote station, the steps of:

identifying a set of said published resources needed to establish the connection;

notifying the central station about the identified resources; and seizing the set of identified resources to thereby establish the connection.

According to another aspect of the present invention, there is provided a communications system in which a remote station is coupled to a central station by a network, the system comprising:

the network;

the central station which comprises:

means for establishing a list of information about available network resources; and means for publishing the list for said remote station;
the remote station which comprises:
means for identifying a set of said published resources needed to establish the connection;
means for notifying the central station about the identified resources; and
means for seizing the set of identified resources to thereby establish the connection; wherein
the central station further comprises:
means for updating said list of available resources to thereby reflect the seizing of said set; and
means for communicating the updated list to said remote station.

According to another aspect of the present invention, there is provided a central station, adapted for operation in a system in which a remote station is coupled to the central station by a network, the central station comprising:
means for establishing a list of information about available network resources;
means for publishing the list for said remote station;
means for updating said list of available resources to thereby reflect seizing of a set of resources in response to a notification from the remote station regarding the seizing of said set of resources in the list; and
means for communicating the updated list to said remote station.

According to another aspect of the present invention, there is provided a remote station, adapted for operation in a system in which the remote station is coupled to a central station by a network, and wherein the central station performs the steps of establishing a list of information about available network resources, and publishing the list for said remote station; the remote station comprising:
means for identifying a set of said published resources needed to establish the connection;
means for notifying the central station about the identified resources; and
means for seizing the set of identified resources to thereby establish the connection.

Other aspects of the invention are also disclosed.

BRIEF DESCRIPTION OF THE DRAWINGS

One or more embodiments of the present invention will now be described with reference to the drawings and appendicies, in which:

FIG. 7 shows an exemplary central station architecture (see APPENDIX A);

FIG. 10 shows an SDL diagram of a Resource Map Broadcast Process part of the Distributed Resource Management Server (DRMS) in the central station;

Appendix A describes an exemplary implementation of the central station;

Appendix B contains an exemplary implementation of the remote station;

Appendix C describes an exemplary physical layer architecture;

Appendix D describes an exemplary link layer architecture;

Appendix E describes an exemplary distributed resource management protocol; and

Figure 1:
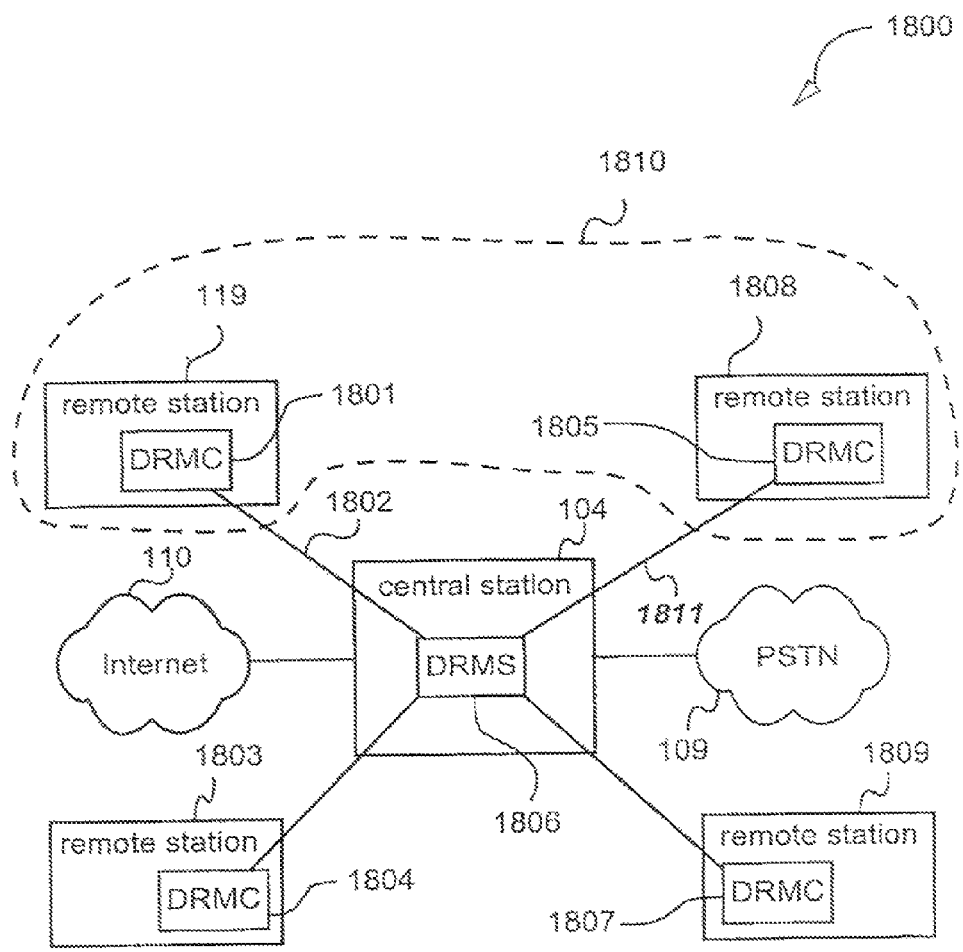
FIG. 1 shows a network, arranged in a star topology, in which the disclosed distributed resource allocation technique can be practiced.

Appendix F describes an exemplary end-to-end packet transmission method used in the network of FIG. 1.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Radio networks use a combination of Frequency Division Multiple Access (FDMA), Time Division Multiple Access (TDMA) and Code Division Multiple Access (CDMA) as generic schemes for the sharing of radio spectrum. These well known techniques allow network operators to create channel pools that are typically allocated between remote stations and a central station, in the case of a 'star' network topology, for the duration of a particular service requested by the user.

Communication may then typically take place between the remote station and the central station using either circuit switched network allocation where a pair of radio channels are allocated in each direction between the remote station and the central station, or using a packet switched technique whereby short packets are transmitted over the radio link using specified time reserved packet allocations.

The disclosed arrangements identify a system for the assignment of radio network circuits between multiple users, using a distributed network access scheme. This radio network access scheme is specifically described for a satellite access scheme, but, the general principle could be applied to any generic radio network.

The disclosed arrangements describe a greatly simplified distributed system for the management of radio channels shared among a large population of users, without the requirement for a complex centralised radio network management facility. Whilst at the same time not suffering from the channel unit receiver operational complexity issues at the Gateway Earth Station.

FIG. 1 shows a network 1800 arranged in a star topology that supports the distributed resource allocation technique. A remote station 119 includes a Distributed Resource Management Client (DRMC) software module 1801 running on a remote station processor (not shown). An exemplary implementation of the remote station 119 is described in APPENDIX B with reference to FIG. 2. A central station 104 includes a Distributed Resource Management Server (DRMS) software module 1806 running on a central station processor (not shown). The DRMC 1801 communicates, as depicted by a connection 1802, with the DRMS 1806. Other remote stations 1808, 1803 and 1809, including corresponding DRMCs 1805, 1804 and 1807, running on respective remote station processors (not shown) communicate with the DRMS 1806 via respective connections. The central station 104 communicates with other networks including the Internet 110 and the Public Switched Telephone Network (PSTN) 109 via respective connections. Each of the remote stations 119, 1808, 1803 and 1809 are located in a geographic domain. Thus, for example, the remote stations 119 and 1808 are located in a domain 1810.

The central station 104 uses the distributed resource allocation technique to distribute, or publish, information describing the available radio channel resources to the remote stations 119, 1808, 1803 and 1809. This information is referred to as a 'resource topology map', as the information is arranged on a geographic domain basis. In one arrangement, the publication of the resource map is performed using a domain specific broadcast protocol. Accordingly, a specific resource map associated with the domain 1810 is published over the connections 1802 and 1811, to the respective remote stations 119 and 1808. The resource map comprises a list of network resource parameters specific to the resource domain 1810. These parameters identify outbound and inbound channels, as well as providing ancillary information relating to the availability of channel capacity, and energy density of each channel in the resource domain 1810.

Each resource topology map is specific to a finite geographic area. This allows the system operator to control the size of resource domains by adjusting the parameters of the corresponding resource topology map. The ability to control the size of the resource domains enables the network system 1800 to scale with increasing traffic volume, by varying the number of channels per domain accordingly. Thus, for example, if the expected traffic in a resource domain becomes undesirably large, the domain can be divided into several smaller domains, each requiring less resources to meet demand. The converse operation is also possible.

Figure 3:
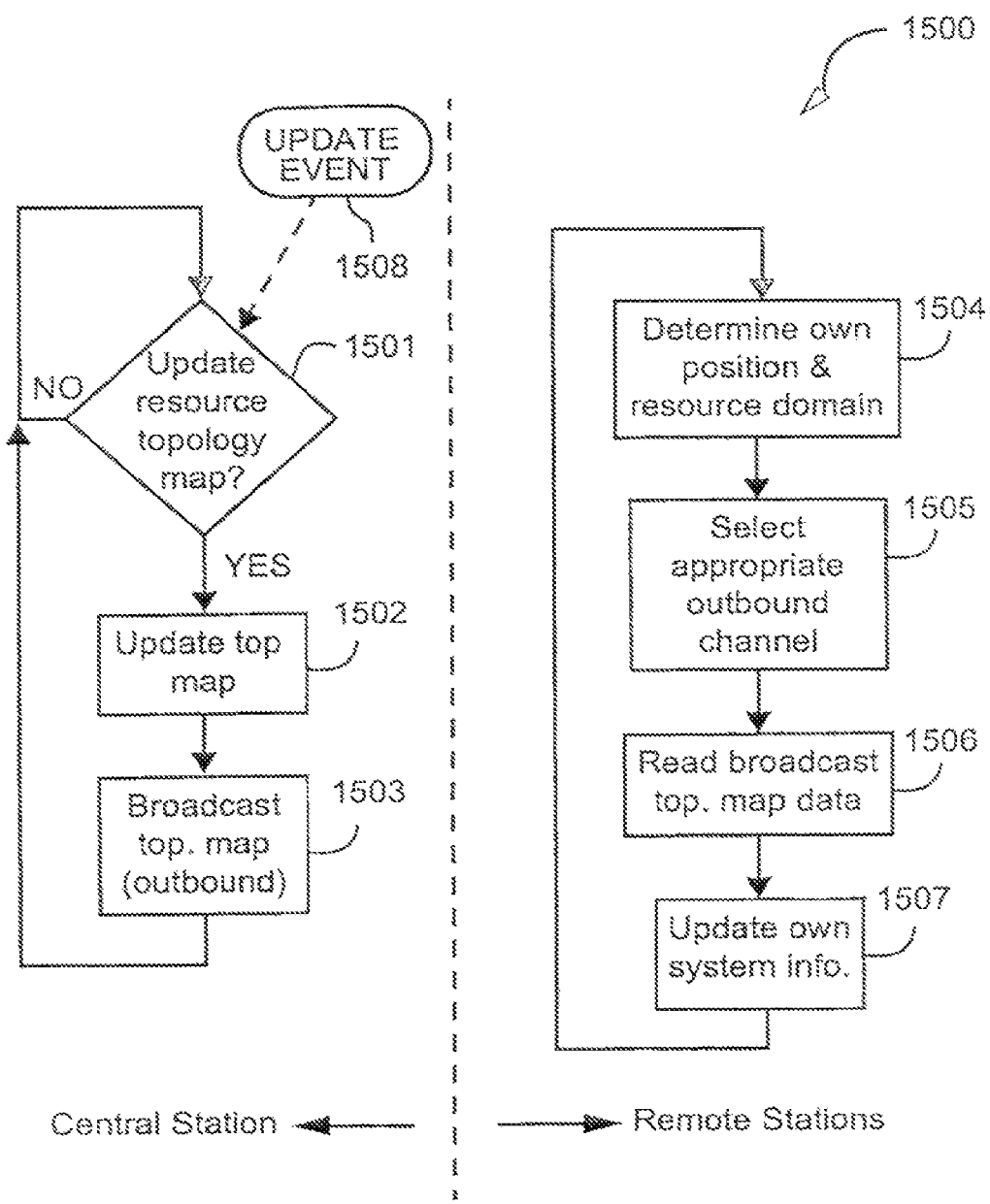
FIG. 3 shows how the central station and the remote stations update topology map information.

FIG. 3 shows a process 1500 of how the central station 104 and the remote station 119 update topology map information. The remote station 119 determines if a specific 'resource topology map' applies to it by determining the current geographic position of the station 119 using, for example, an integrated GPS receiver 115 (see FIG. 6) and accessing information stored in memory in a local Personal Computer (PC) 1900 to identify its current resource domain. The information that the remote station 119 requires to identify its resource domain may be programmed into the remote station 119 as part of the manufacturing process, or published, eg via broadcast, over the outbound channel 101 (see FIG. 6) using a process similar to the resource map broadcast process. Based upon the derivation of its current resource domain the remote station 119 knows which resource topology map applies to it.

The process 1500 commences, having regard to the central station 104 which is depicted on the left hand side of FIG. 3, with a step 1501 which tests whether the resource topology map in question needs to be updated. Topology maps are domain specific, and a process 1500 is performed in parallel for each geographic domain such as 1810 in FIG. 1. If updating is required, the process 1500 proceeds according to a YES arrow to a step 1502. The step 1502 updates the topology map, after which a step 1503 broadcasts (ie publishes) the updated topology map to all the remote stations (eg 119 and 1808) in the to domain in question (ie 1810). The process 1500 is then directed back to the step 1501. Returning to the step 1501, if updating is not required, then the process 1500 is directed by a NO arrow back to the step 1501. An update event 1508 (such as is depicted in a step 1703 in FIG. 5), triggers the step 1501.

Having regard to the remote stations such as the station 119 in FIG. 1, the process 1500 commences with a step 1504 which determines the geographic position, and thus the corresponding geographic domain (ie 1810) of the remote station 119. A following step 1505 selects an appropriate outbound channel 101 (see FIG. 6) from which a subsequent step 1506 reads the relevant broadcast topological map data that is relevant to the station 119. Thereafter a step 1507 updates the topological map data that the remote station 119 stores locally, after which the process returns to the step 1504.

Figure 4:
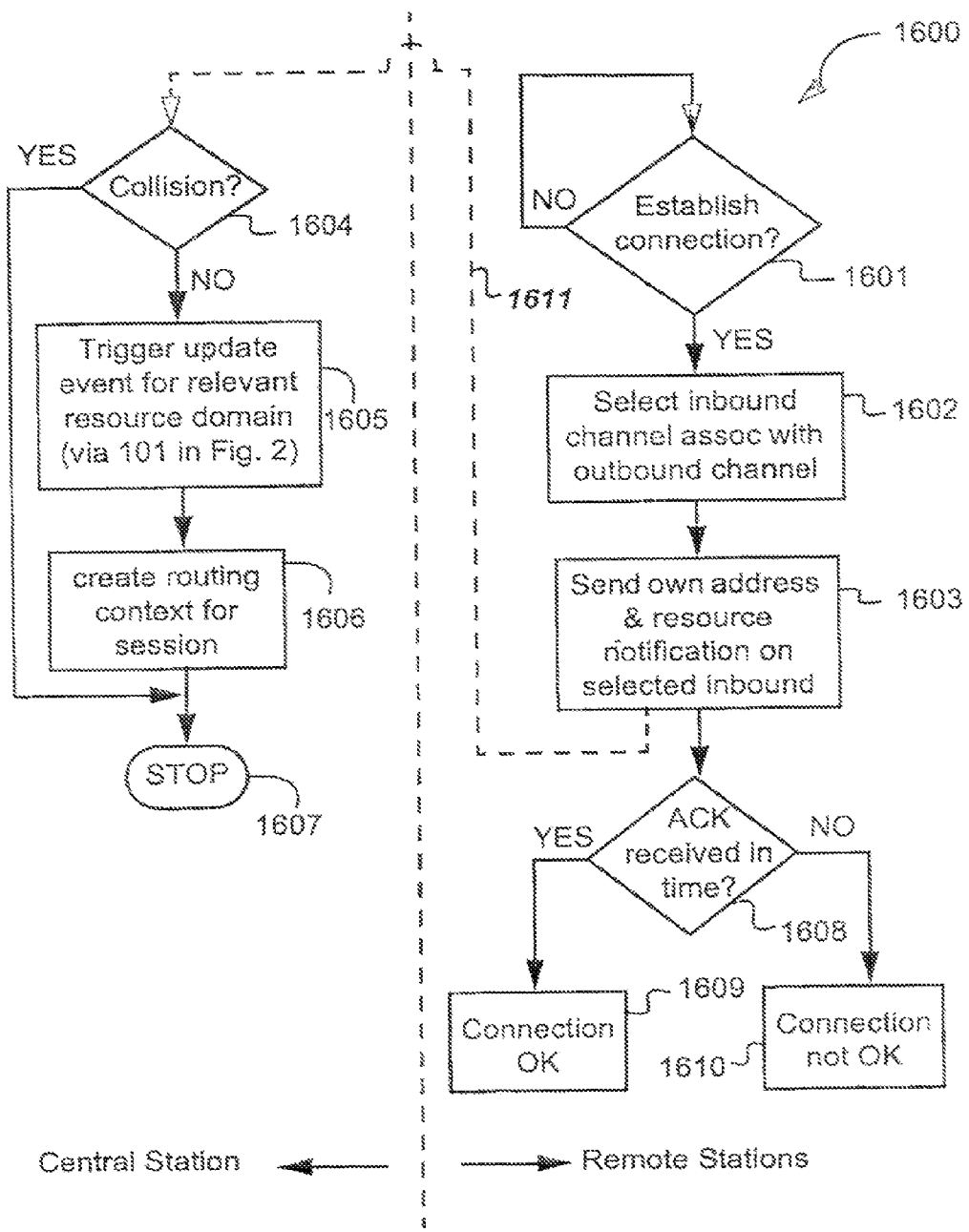
FIG. 4 shows how a remote station establishes a connection by seizing needed network resources, and how the central station updates topology map information in response thereto.

FIG. 4 shows a process 1600 of how the remote station 119 establishes a connection by seizing needed network resources, and how the central station 104 updates topology map information in response thereto. When the remote station 119 wishes to establish a connection for the purposes of providing a requested service, the remote station 119 selects the best available radio channel using the information provided by the current resource topology map. The best channel is selected using a suitable selection algorithm based, for example, on maximum received power of the outbound channel. This constitutes an update event 1508 that triggers a topology map update by the central station 104 which then broadcasts the updated topology map to the domain in question 1810, thus informing other remote stations such as 1808 of the now-available network resources. This update allows all other remote stations operating within the same resource domain to update their local copies of the 'resource topology map'.

The process 1600 commences, having regard to the remote station 119 (see FIG. 1), with a testing step 1601 that determines if a connection (associated with a communication session) is to be established. If this is not the case then the process 1600 follows a NO arrow back to the step 1601. If however a connection is to be established, then the process 1600 follows a YES arrow to a step 1602 that selects an available inbound channel which is associated with the outbound channel that was identified in the step 1505 of FIG. 3. A following step 1603 sends the address of the remote station 119 and a resource notification message on the selected inbound channel. This triggers, as depicted by a dashed arrow 1611, a collision detection step 1604 performed by the central station 104. If the central station does not detect a collision then the process 1600, now referred to the central station 104, follows a NO arrow to a step 1605. The step 1605 triggers an update event (see 1508 in FIG. 3) for the relevant resource domain (1810) to which the remote station 119 belongs. In a following step 1606 the central station 104 creates a context for the session that has been established so that all further packets received from the remote station 119 are appropriately routed (this is described in more detail in regard to FIG. 6). The process 1600, in regard to the central station 104, is then directed to a stop step 1607. Returning to the step 1604, if a collision is detected, then the process follows a YES arrow to the step 1607.

Returning to consideration of the remote station 119 after the step 1603, a following step 1608 check to see if an acknowledge signal is received within a predetermined time window from the central station 104, thus indicating that no collision has been detected. If the acknowledge signal is received in time, then the process 1600 is directed by a YES arrow to a "step" 1609 which is fact merely indicates that the connection has been properly established. If on the other hand the acknowledge signal is not received in the allowed time, then the process 1600 is directed by a NO arrow to a "step" 1610 which indicates that the connection has not been properly established.

Figure 5:
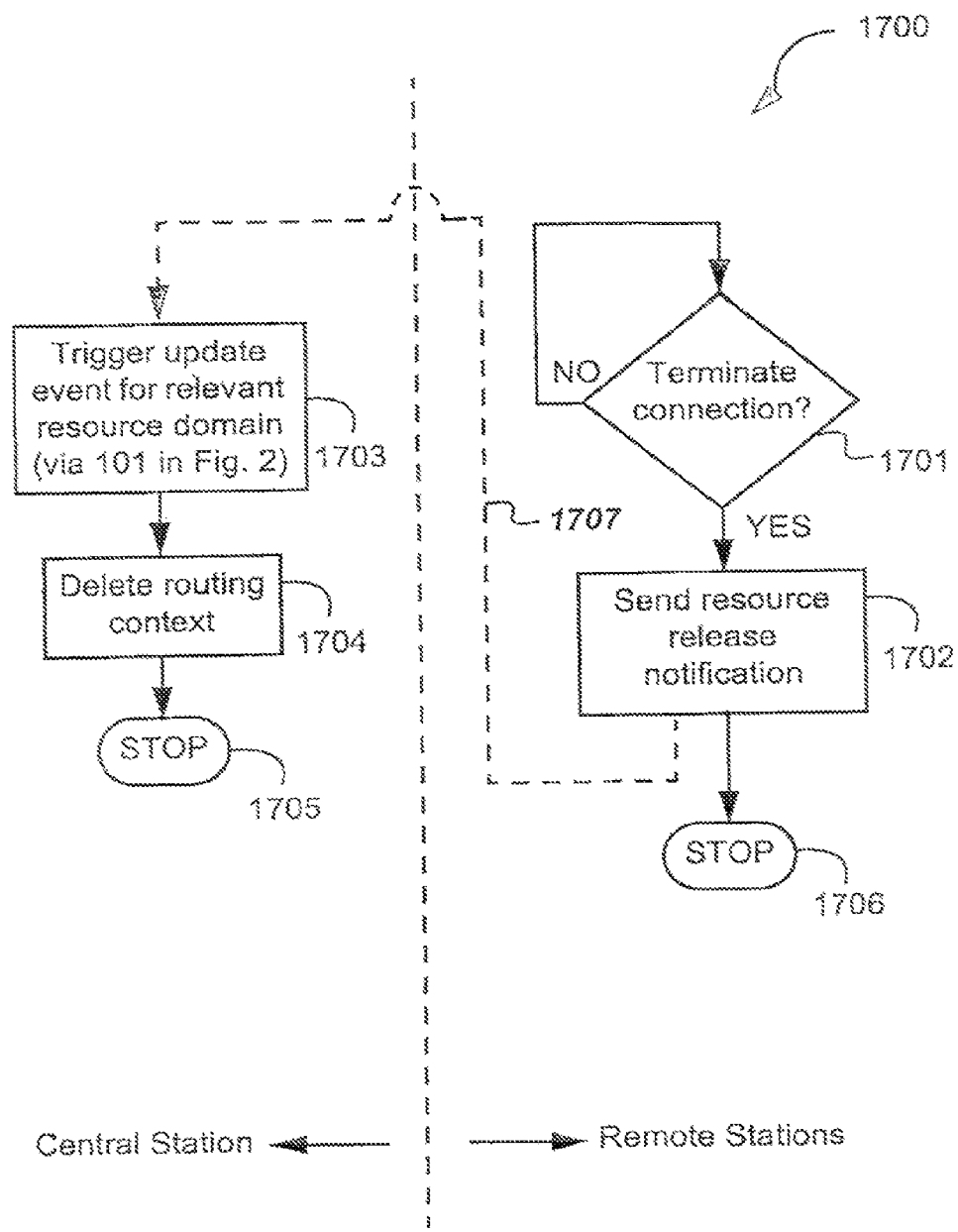
FIG. 5 shows how the remote station tears down the connection, and how the central station updates topology map information in response thereto.

FIG. 5 shows a process 1700 of how the remote station tears down the connection, and how the central station updates topology map information in response thereto. The process 1700 commences, having regard to the remote station 119, with a testing step 1701 that determines if the connection, established in accordance with the process 1600 in FIG. 4, is to be torn down. If this is the case, then the process follows a YES arrow to a step 1702 that sends a resource release notification to the central station 104. This is sent, via 101 in FIG. 6, and as depicted by a dashed arrow 1707, to the central station 104 where it causes a step 1703 to trigger an update event (see 1508 in FIG. 3). In a following step 1704 the central station 104 deletes the routing context that was established in the step 1606 in FIG. 4, after which the process 1700 terminates at a step 1705 in regard to the central station 104. Returning to the step 1702, the process then terminates at a step 1706 in regard to the remote station 119.

Figure 6A:
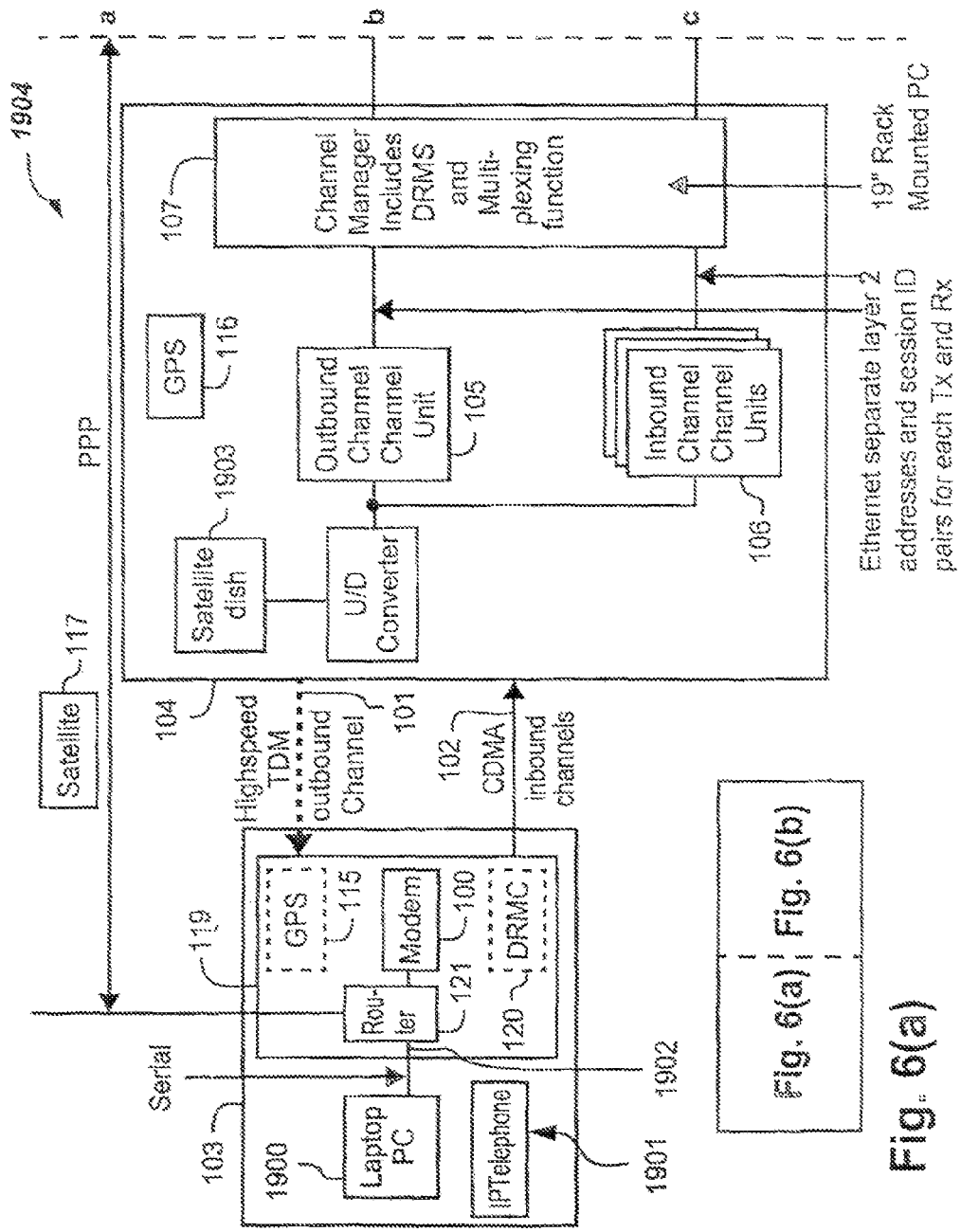
FIG. 6 shows a fragment of the network in FIG. 1.

FIG. 6 shows a fragment 1904 of the network architecture of FIG. 1. The network provides a two-way channel allocation between a user 103 and the central station 104, using the distributed resource allocation technique. The arrangement uses a packet data structure conforming to the Internet Protocol termed UDP or TCP/IP. This protocol is used to support telephony using standard Voice Over IP (VoIP) and other data services. Using these techniques the network can support circuit switched or packet based services.

The remote station 119 comprises a radio modem 100, the Global Positioning System (GPS) receiver 115, and the Distributed Resource Management Client (DRMC) module 120. Standard data communicating equipment (DCE) may be connected to the remote station using a standard serial interface connection (e.g. V.35) or an Ethernet connection. To support IP telephony executing on the PC 1900, the remote station 119 provides a path between the PC 1900 and a standard router 111 that is connected to the PSTN 109. To support stand-alone IP phones or analogue phones requires use of an IP router 121 in the remote station 119. The remote station 119 uses a small aperture C band antenna (not shown), the gain of which is typically be between 15 dBi and 30 dBi.

The central station 104 comprises one or more outbound radio channel modems 105 and a number of inbound channel modems 106. An exemplary implementation of the central station 104 is described in APPENDIX A with reference to FIG. 7. A multiplexing device 107 provides an interconnection to the standard router 111 which provides Point-to-Point (PPP) protocol services and interfaces to the PSTN 109 and/or the Internet 110. A firewall function 108, that may be part of the standard router 111, provides security between the Internet 110 and the central station 104. An inbound channel unit 106 is provided at the central station 104 for every inbound frequency contained in the resource map. A semi-permanent or pre-assigned channel allocation based upon geographic position is made to each remote station for each satellite in the network, such that the remote station can access shared TDM outbound channels following 'power-up'.

The central station antenna 1903 has a gain in excess of 50 dBi. The C band satellite 117 uses various transponders termed Global, hemi-spherical and Zone beams with different radio signal "footprints".

A medium rate TDM outbound channel 101 is transmitted from the central station 104 to a Geo-stationary satellite 117 operating in the C Band satellite band (6.0 GHz). The outbound channel 101 is retransmitted from the satellite 117 at the paired satellite frequency band (4.0 GHz) to be shared between users (103) operating in the allocated outbound frequency band in the particular resource domain 1810. The system 1904 is designed primarily to operate using high gain regional coverage hemi or zone beams.

A typical 9 MHz bandwidth outbound channel carries a 2 Mbps statistically multiplexed channel supporting 1000 user, or up to 250 simultaneous active users. The outbound channel 101 uses spread spectrum modulation with a spreading factor of four to overcome adjacent satellite interference when operating with medium gain, broad beam-width remote station antennas (not shown). Alternately, the outbound channel 101 can use narrow-band Time-division-multiplexed modulation. In the CDMA case, direct sequence spreading ratios between 1 and 65, using standard and complex code sequences are supported. BPSK or QPSK modulation schemes, using Turbo Convolutional codes, are used including tiered codes to ease acquisition with significant frequency offsets with respect to the channel data rate.

To support more users, the dimension of the outbound channel 101 can be increased in 1.125 MHz increments. The C band satellite 117 typically uses multiple 72 MHz transponders, and consequently a large number of TDM outbound channels may be allocated for the overall system. Each outbound channel 101 has a flexible number of inbound channels 102 which support transmissions from the remote station 119 at C band (6 GHz) transmitted over the satellite 117 and received at C band (4 GHz) at the central station 104.

Each inbound channel 102 is directly related to a specific outbound channel 101. The inbound channel data rate does not need to match the individual per user outbound channel rate but would typically be selected to exceed or match the per-user inbound required rate. The implementation as described provides an average forward channel nominal per user of 8 kbps and an average return channel data rate of 2 kbps.

The bandwidth of the inbound channel 102 does not need to match that of the outbound channel 101. For example an inbound channel bandwidth of 2.25 MHz, and four lots of return channel spectrum would be allocated against the single outbound channel allocation described above. However, this configuration of outbound and inbound channels is provided as an example, and the system 1904 typically supports outbound band-widths in the range from 1.125 MHz to 9 MHz with multiple lots of return channel spectrum allocated for every outbound channel allocation.

The remote station 119 uses the distributed resource allocation technique when operating with the central station 104 in the star network topology described in relation to FIG. 1. Although FIG. 1 illustrates a multiplicity of remote stations 119, 1808, 1803 and 1809 operating via the single central station 104, the distributed resource management technique performs equally well for the case of overlapping star networks in which case remote stations may transit between operation with one central station to any other central station in the network for which the remote station can receive the central stations outbound transmissions.

The remote stations are equipped with receive and transmit helical array antennas (see 216, 217 in FIG. 2) that provide 22 dBi gain nominally, and are circularly polarised. The remote stations receive a medium rate outbound TDM signal (e.g. 2 Mbps) that may be operated un-spread (e.g. 1 chip per symbol) or spread at a rate up to 127 chips per symbol using either BPSK or QPSK modulation schemes. In the preferred arrangement the outbound TDM carrier is a direct sequence spread spectrum QPSK modulated carrier with a spreading factor of 4 using a rate ⅓ turbo product code FEC and occupying a 9 MHz noise bandwidth. The receiver implementation software in the remote station 109 can be configured at run time to operate in the desired mode of operation. The spreading code rate and modulation scheme employed are selected based upon adjacent satellite interference considerations and remote station position in the beam of the satellite 117 during operation and may be varied accordingly.

The integrated GPS receiver 115 is used by the remote station 119 to derive the geographic position of the remote station 109, and to synchronise transmit code phase and chip timing at the satellite 117 (eg compensate for channel delay) such that the start of any burst and code sequence is aligned to within 25 μsec of the GPS reference start time. This burst, chip, symbol and code phase synchronisation allows the receiver of the central station 104 to be controlled so that the dispreading function search window is reduced such that the processing power required to perform the dispreading function is not excessive.

The central station 104 provides resource map broadcast functions in support of the distributed resource management technique. The central station 104 receives inbound burst spread spectrum signals for each active remote station in the network. The remote stations use a combination of CDMA and TDMA techniques to share the inbound frequency resource. The inbound carriers are direct sequence spread spectrum QPSK modulated carriers with a spreading factor of 13 using a rate ⅓ turbo product code FEC with each carrier occupying a 9 MHz noise bandwidth and providing a 128 kbps maximum user bit rate per carrier. At the central station 104 a single burst CDMA demodulator is used to demodulate all the timeslots and spreading codes allocated for use in that spread spectrum frequency band. These frequency bands are equally spaced on a 100 kHz grid at any frequency within the nominal 6 GHz frequency band.

Figure 12:
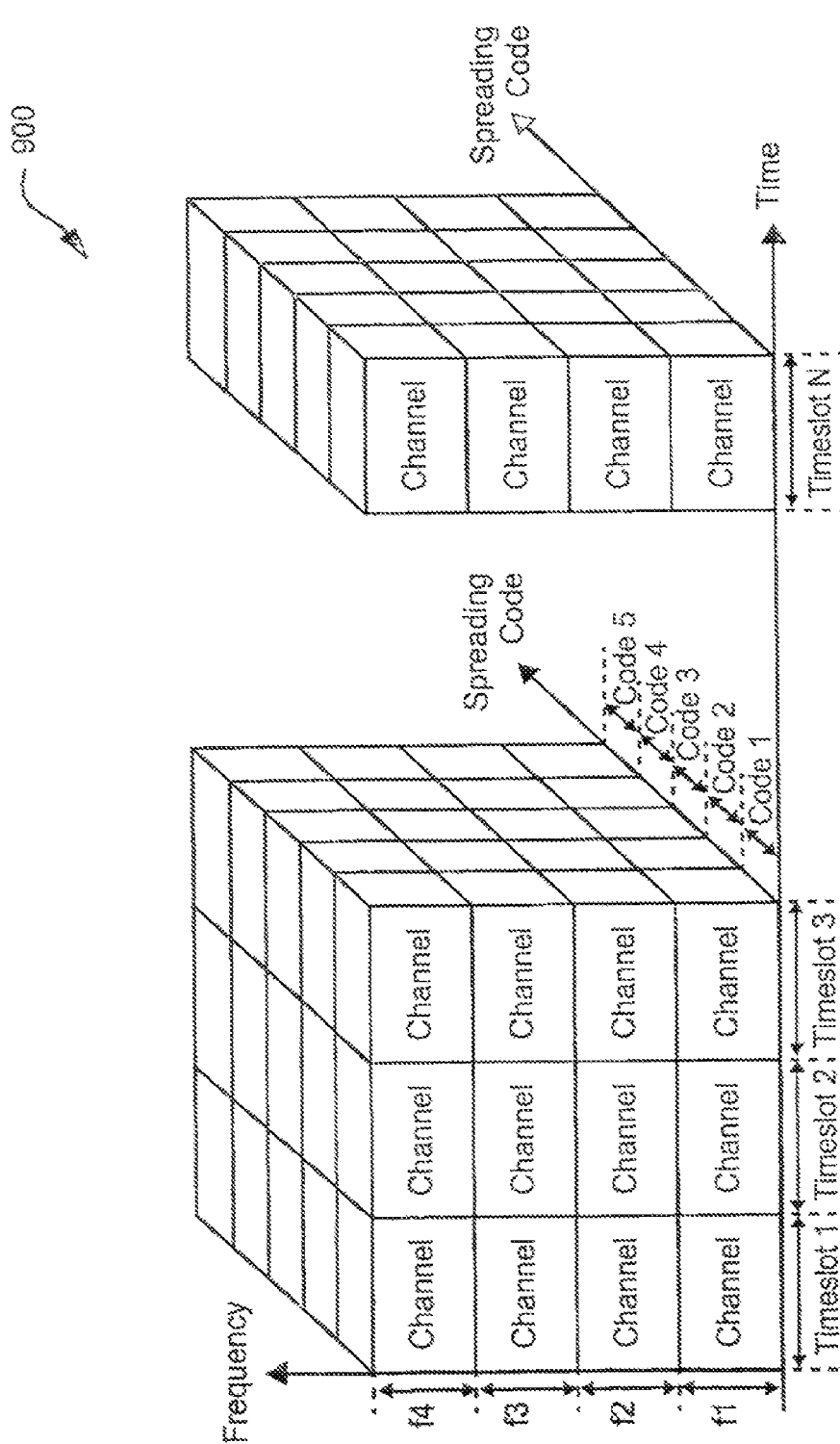
FIG. 12 shows a radio resource allocation example.

The inbound carriers are direct sequence spread spectrum QPSK modulated carriers with a spreading factor of 11 using a rate ⅓ turbo product code FEC with each carrier occupying a 2.5 MHz noise bandwidth and providing a 128 kbps maximum user bit rate per carrier. The structure of the inbound resources used is illustrated in FIG. 12. This inbound structure when associated with a single or multiple outbound TDM carriers is termed a transmission group.

Figure 9A:
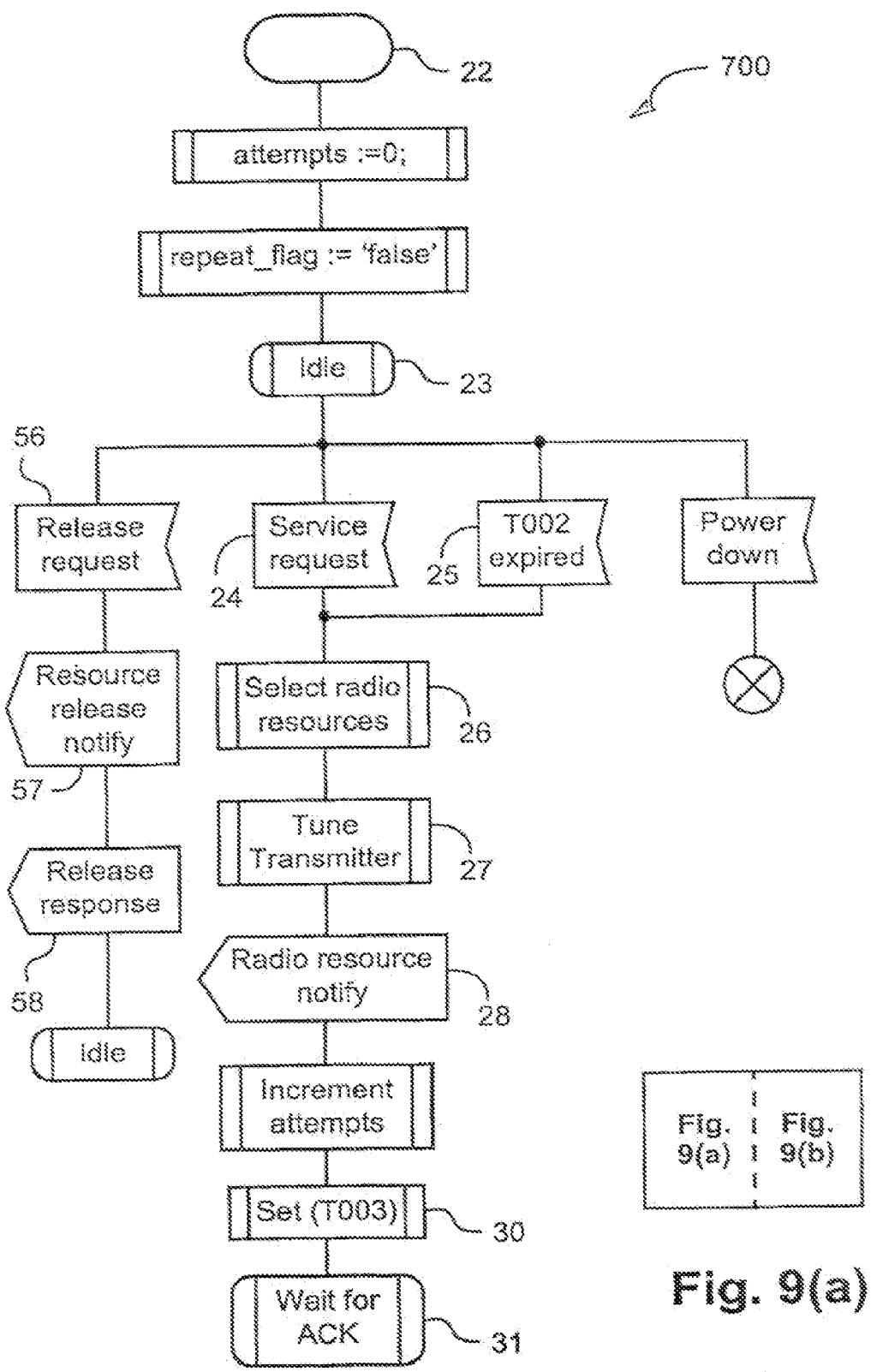
FIG. 9 shows an SDL diagram of the Channel Selection/Release Process part of the Distributed Resource Management Client (DRMC) in the remote station.
Figure 9B:
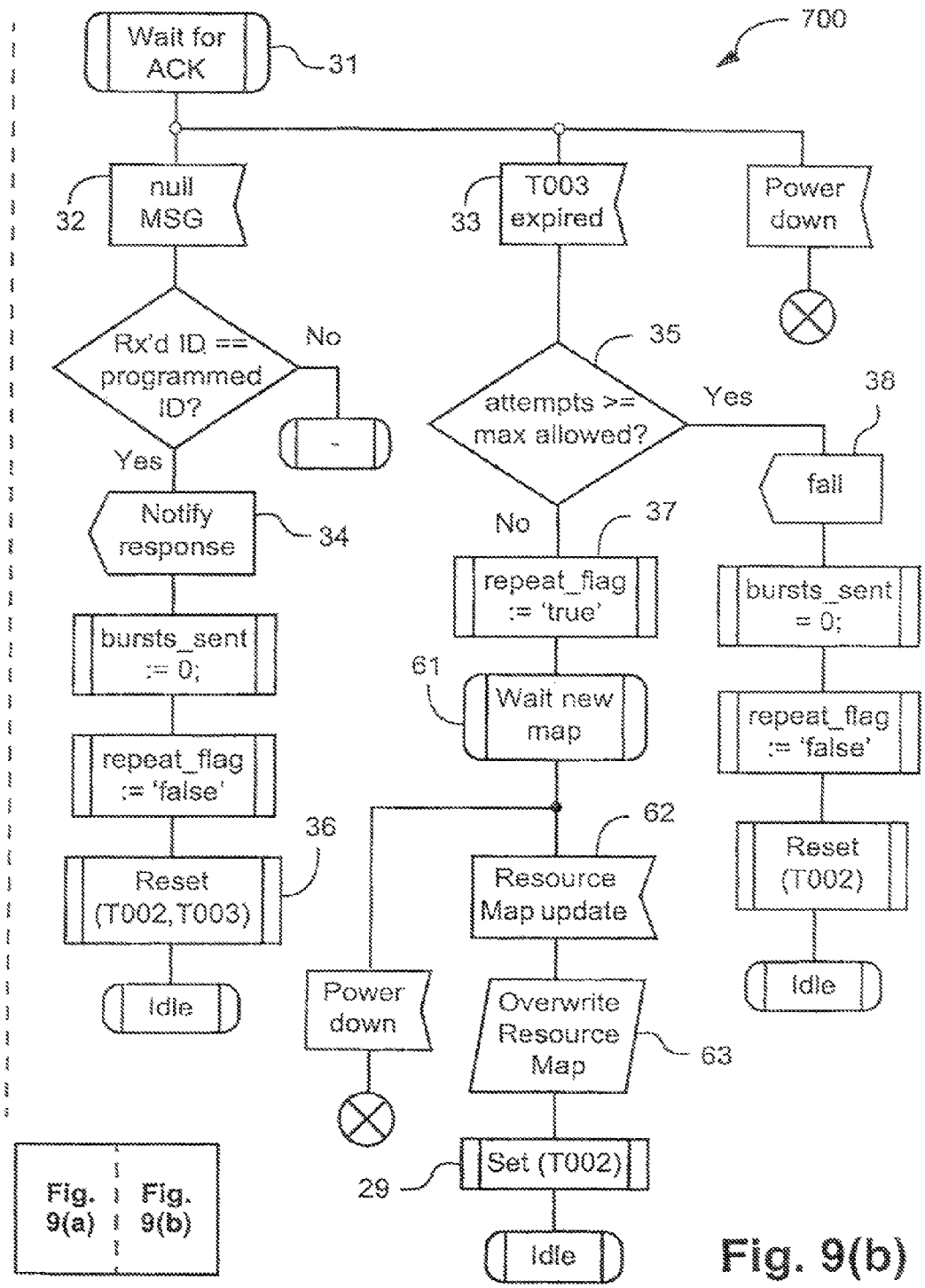

The radio resource structure used in the preferred arrangement consists of transmission groups comprised of one outbound TDM carrier as previously described associated with four inbound carriers each providing a TDMA/CDMA structure as illustrated in FIG. 9. This radio resource structure is one structure that may be used to implement the disclosed arrangements, however there are numerous other radio resource structures that may implement the disclosed arrangements equally well The geostationary satellite 117 is used to relay transmissions between the central station 104 and remote stations 119 and vice versa. The heart of the satellite is a transponder that receives signals at a nominal 6 GHz frequency and retransmits them at a nominal 4 GHz frequency.

Figure 8A:
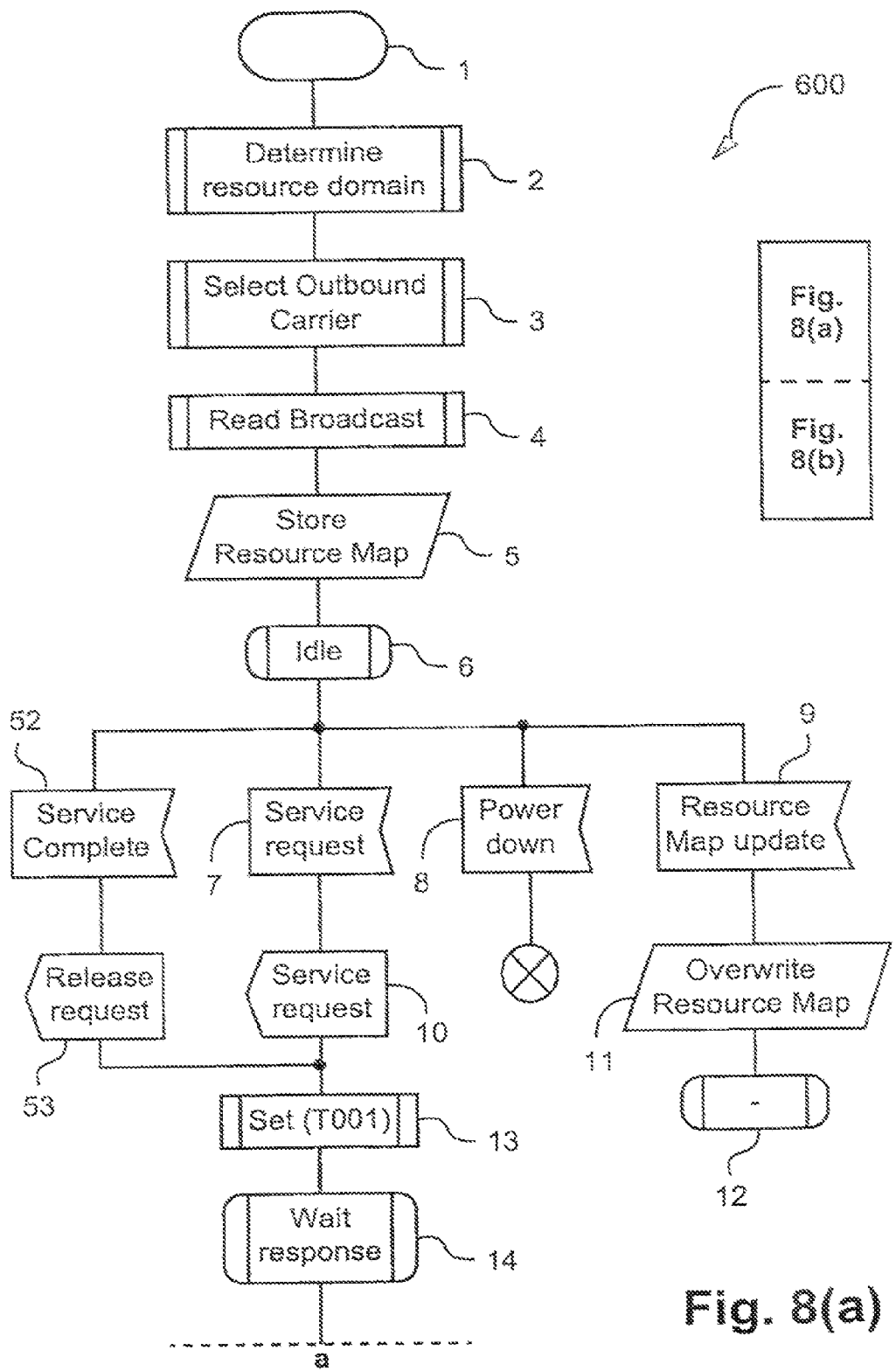
FIG. 8 shows a System Description Language (SDL) diagram of the Dynamic Resource Management Process part of the Distributed Resource Management Client (DRMC) in the remote station.
Figure 8B:
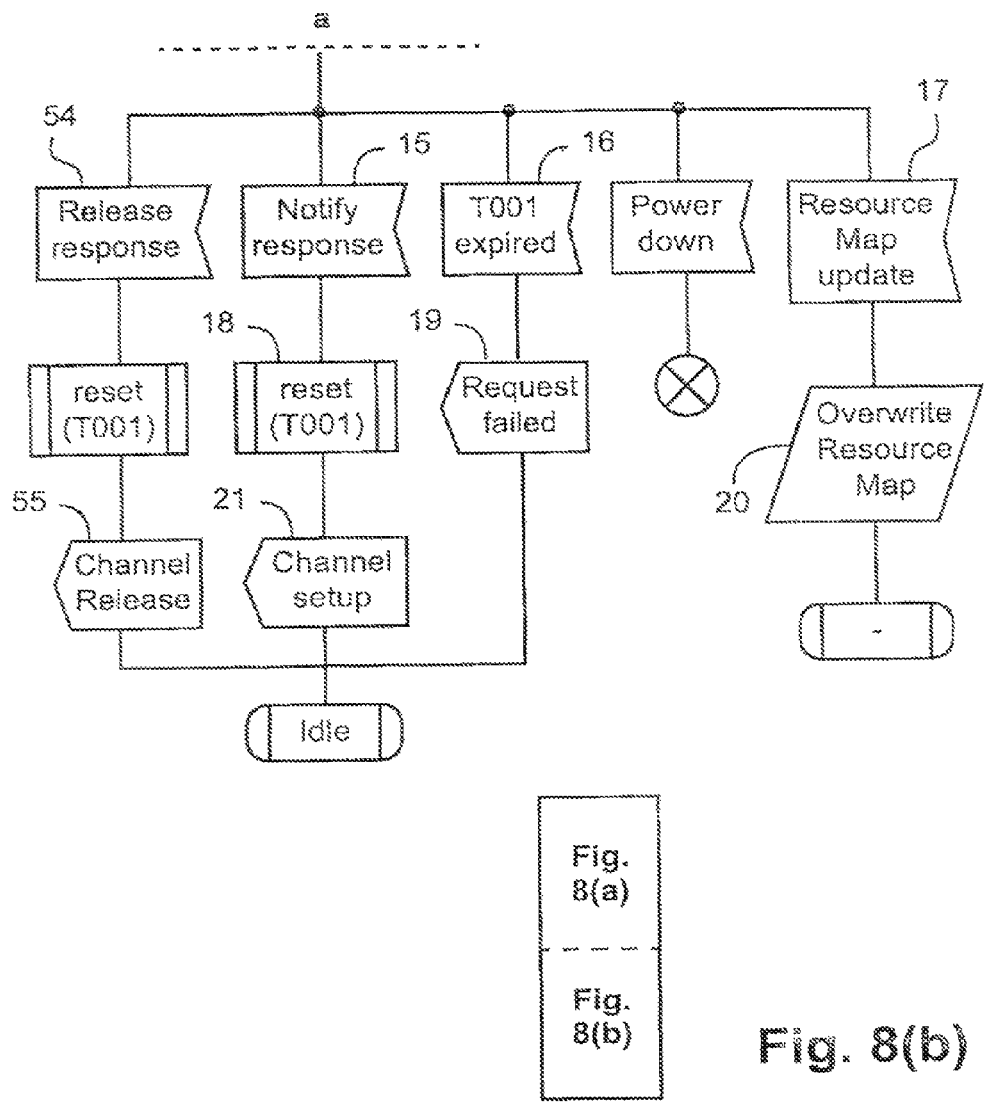

From a procedural perspective, the operation of the system depicted in FIG. 6 is now described, having regard in particular to FIGS. 8-10. FIG. 8 shows a System Description Language (SDL) diagram of the Distributed Resource Management Process part of the Distributed Resource Management Client (DRMC) in the remote station. FIG. 9 shows a System Description Language (SDL) diagram of the Channel Selection/Release Process part of the Distributed Resource Management Client (DRMC) in the remote station. FIG. 10 shows a System Description Language (SDL) diagram of a Resource Map Broadcast Process part of the Distributed Resource Management Server (DRMS) in the central station.

Returning to FIG. 6, the network 1800 or 1904 using distributed resource management can be operated in what is referred to as an "implied mode", or a "normal mode" or using a combination of both modes. In implied mode the remote stations 119, 1808, 1803 and 1809 are provided, as part of the manufacturing process, with a database of parameters that define a single channel for each service (e.g. frequency, timeslot, burst duration, code, service) that may be used by the respective remote station in each resource domain in which the remote station will operate. The remote stations use these databases to select channels for operation without receiving an outbound carrier;

The following description is directed to the "normal mode" of operation. Normal mode and implied mode operation may co-exist in a network, however the channels and associated receivers must be allocated on a one-to-one basis exclusively to those remote stations operating in the implied mode;

A remote station knowing its position, makes reference to a locally stored database of frequency and code allocations for that area (resource domain) in order to select a specific outbound channel, and seeks to identify the corresponding Outbound TDM channel. On acquiring that Outbound TDM channel the remote station demodulates the signal and ensures that it has locked on to the appropriate Outbound TDM. The remote station may also use the received signal strength indication to ensure its antenna is optimally pointed at the desired satellite using manual or automatic procedures (see procedures 2, and 3 in FIG. 8);

The remote station now monitors all Outbound TDM channel slots to collect system information broadcasts that contain the resource map specific to its current resource domain and stores the resource map in dynamic storage (see procedure 5 in FIG. 8).

Figure 11:
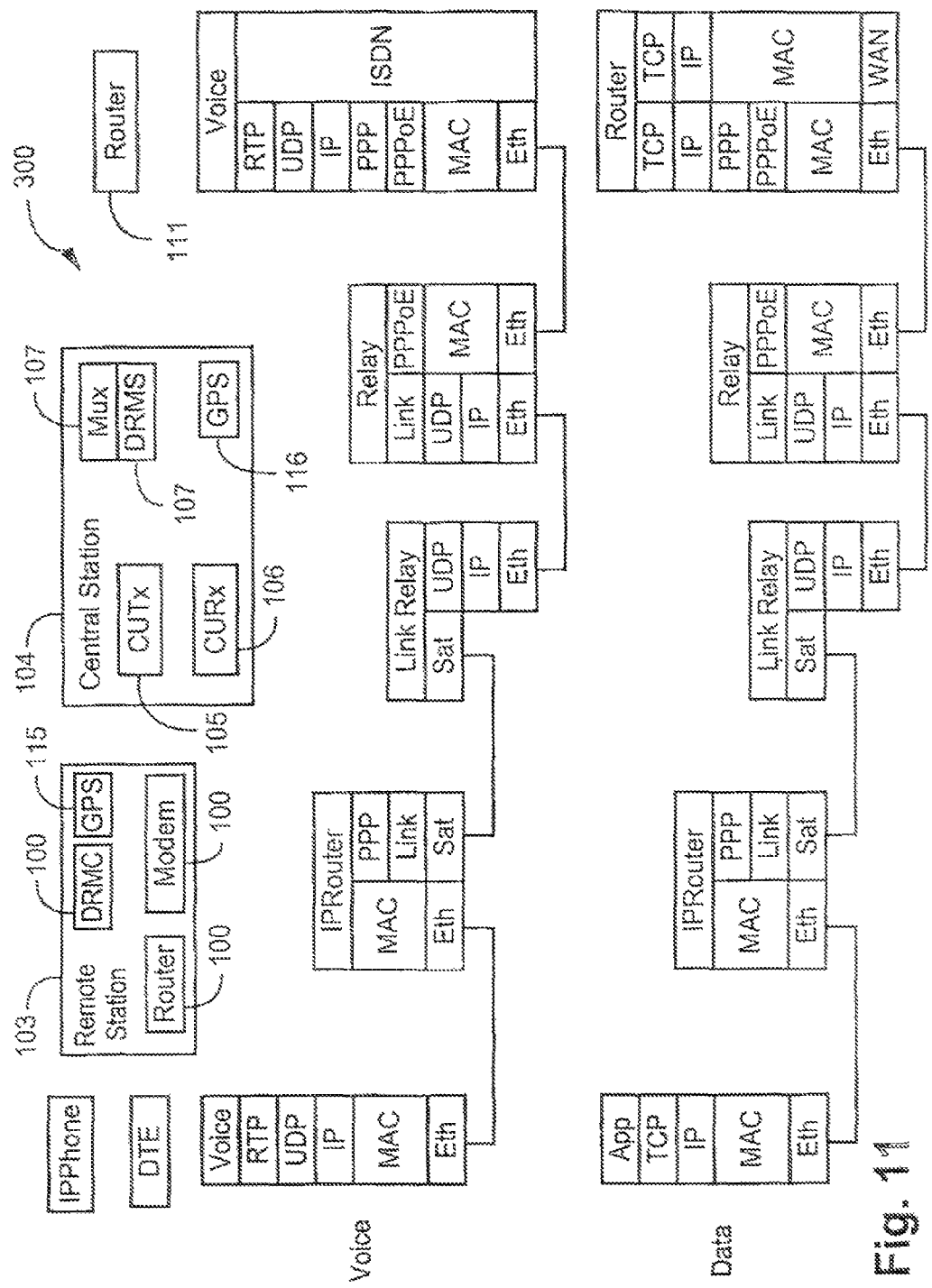
FIG. 11 shows an exemplary protocol stack for the network of FIG. 1 (see APPENDIX D)

The broadcast information is divided up into subgroups that are referred to as tables. These tables may be further categorized as either static or dynamic in nature. Static tables contain information that does not change frequently and therefore may be transmitted relatively infrequently. Dynamic tables however contain information that is frequently updated and therefore must be transmitted often. The resource map is categorized as a dynamic table and therefore should be kept small and must be transmitted frequently and immediately upon command;

The resource map comprises several tables most are static in nature while one is dynamic. The static tables contain information regarding inbound and outbound channels that are allocated for use in a resource domain. The information contained in these tables is typically frequency, timeslot, code sequence, turbo-coding rate, modulation type, and service information. Where service is a parameter that describes the Grade of Service and/or Quality of Service provided by that channel. The dynamic table contains a bit map that provides information regarding the current status of the channel (e.g. free, busy, unavailable, etc.);

The remote station continuously monitors the Outbound TDM channel to detect any updates to the system information and to determine if any packets are addressed to the remote station using a link layer protocol (see FIG. 11 and APPENDIX D) based on HDLC that contains broadcast, multicast, or unicast link layer addresses that were pre-allocated to the remote station at registration (see procedure 5 in FIG. 8). FIG. 11 shows an exemplary Protocol Stack, and APPENDIX D describes the position of the link layer within the system protocol framework. The remote station may also monitor the received signal strength, BER or other signal quality schemes and identify if a higher rate or a lower rate outbound channel data rate may be available for the remote station operation. The outbound data rate selection may also be used to set the inbound channel data rate for initial access.

The remote station is now ready to initiate transmission to the central station and is effectively in the 'idle' state (see procedure 6 in FIG. 8), and can access the network using standard PPP network call start-up procedures transmitted on radio channels selected from the list of available inbound and outbound channels contained in the resource map specific to the current resource domain. Use of an accurate position determining device such as a GPS receiver, allows the remote station to calculate the path distance to the selected satellite and with the reception of the outbound TDM channel it is able to make code timing and frequency adjustments to compensate for different path delays or frequency offsets;

Following the receipt of a request to establish a connection (see procedure 7 in FIG. 8 from the user using either manual or automatic means (e.g. using a PC connected to the remote station the user requests the establishment of a PPP connection using a commercial off the shelf PPP dial up software package) the remote station selects an inbound radio channel (characterised by a frequency and code pair, see procedure 26 in FIG. 9) and initiates a PPP session establishment procedure using specific PPP request packets encapsulated within an HDLC frame that contains the link layer address of the remote station and a resource notification transmitted over the selected inbound channel;

Upon receipt of the resource notification (see procedure 43 in FIG. 10) containing the selected inbound resource identification and domain information the central station verifies that there is not a collision (e.g. two remote stations access the same resource) within the short period required to update the resource map following selection by a remote station (see procedure 45 in FIG. 10) updates the dynamic part of the resource map (see procedure 48 in FIG. 10) and immediately broadcasts the updated information to all remote stations (see procedure 49 in FIG. 10) in the network on the outbound TDM channel specific to the effected resource domain, creates a routing context (see procedure 51 in FIG. 10) such that the current and any further received PPP packets received from the remote station may be routed from the selected inbound channel unit to the standard router and from the standard router to the channel unit transmitting the carrier that contains the selected outbound channel.

Packets received by the PPP server function in the standard router are then acknowledged by the router using standard PPP formats routed to the channel unit transmitting the carrier that contains the selected outbound channel (see procedure 32 in FIG. 9).

In the event of a collision, where a collision is defined as an attempt by a remote station to select an inbound and or outbound resource that is not available as a result of the delay between the receipt of a resource notification at the central station and the subsequent broadcast of an updated resource map, then the central station will silently discard the received resource notification (see procedure 45 in FIG. 10) and any associated PPP request packets and the PPP server function in the standard router will not respond to the PPP request packets sent from the remote station. The PPP specifications allow for a specified time out interval whereby if a response to the request packets is not received within a specified time (nominally not less than 800 ms) the session attempt times out and fails. It should be noted that all PPP session connections are initiated by the remote station, however, once a PPP session is established the remote station can receive data connections and voice calls;

An implied signalling system between the remote station and central station has been used whereby no response from the central station is termed a call establishment failure. Following a failure the remote station stops accessing the network until it receives an updated 'resource map' and a randomised automatic retry timer expires (see procedures 29, 33 and 25 in FIG. 9);

The multiplexing device 107 provides a connection to the standard router using MAC addresses that are unique for each active remote station. The multiplexing device connects to an outbound channel unit using one UDP socket address and provides the outbound channel unit with the TDM frame payload in a continuous mode. The multiplexing device maintains a routing table that maps UDP socket addresses to remote station MAC addresses and session ID pairs and selected channels. Updates to this table are triggered by the receipt of either a routing update (see procedure 51 in FIG. 8) or delete route (see procedure 60 in FIG. 8) primitive from the DRMS. The multiplexing device receives frames of data from the Inbound Channel Units based on a unique UDP address per Inbound Channel Unit. If the Inbound Channel Unit supports multiple connections from multiple remote stations, then the frame will contain the Remote station ID of each remote station so that the packet can be routed to the correct PPP connection running on the standard router. The traffic from the standard router to the remote station is non continuous and is based upon the users instantaneous traffic profile. This allows the outbound link to be statistically multiplexed.

The remote station uses standard protocols such as Internet PPP or similar data protocols between user and central station for management of data sessions when the user is actively accessing the network. For example the 'null MSG (see procedure 32 in FIG. 9)' used to acknowledge a 'radio resource notify (see procedure 57 in FIG. 9)' would typically contain a PPP Link Control Protocol 'configure-ack' packet. The PPP protocol is used to establish a data session, including user identification and authentication.

When all remote station data sessions are completed (e.g. all PPP sessions have been terminated using the standard PPP Link Control Protocol procedures) the remote station will release the radio network resource that it was using to support the carriage of data packets between the remote station and central station, thus making these resources available to other remote stations within the resource domain. In order to release a radio resource the remote station simply sends a resource release notify (see procedure 57 in FIG. 9) to the central station.

The receipt of a resource release notify (see procedure 59 in FIG. 10) at the central station triggers the update of the dynamic part of the resource map specific to the resource domain effected and the deletion of the routing context by the multiplexing unit as a result of the receipt of a 'delete route' primitive (see procedure 60 in FIG. 10) from the DRMS. The updated resource map is broadcast at the next scheduled broadcast time. The previously unavailable radio resource is now available for selection by any remote station operating within the effected resource domain.

As user authentication and IP address allocation are part of the PPP session establishment procedures described above, remote station mobility may be provided by using these standard features of the PPP protocol along with SIP location registration and redirection procedures. Therefore the remote station may seamlessly transition between central stations simply by terminating a PPP session with one central station and establishing a PPP session with another central station using the procedures described.

Additionally voice calls can be initiated from the remote station or PSTN. Session Initiation Protocol (SIP) provides an end-to-end client server session signalling protocol. Calls to the PSTN or other network are supported using the SIP protocol and voice gateway integrated into the Internet Router 111. For remote station originated calls the user's 103 IP phone sends an Invite request to the SIP server 112 that then initiates the SS7 IAM message via the Voice Gateway 111. The called party responds which causes and ACK message to be sent to the remote station. The call is then setup between the user 103 the Voice Gateway 111 and phone within the PSTN. The RTP protocol is used in conjunction with the TCP/IP protocol suite for carriage of the voice service over the radio link.

The bandwidth required for transmitting voice over a satellite is dependant upon the choice of voice codec, the choice of underlying transmission protocol and the assumptions of voice activation. The system relies on the use of an efficient voice codec and a protocol that does not retransmit packets if they are lost. Typical implementations of voice over IP utilise Real Time Protocol (RTP) running over UDP. Using the appropriate combination of these and the use of header compression can ensure that the link bandwidth is minimised. The system must allow for the peak bandwidth on the return link and then statistically multiplex the forward link dependant upon voice activation. A variable bit rate CDMA transmitter from the remote station also allows the network to take advantage of Voice Activation Detection (VAD). Typically header compression compresses the headers from 40 bytes to two or four bytes;

To ensure that the forward link is not congested the connection between the Internet Router 111 and the multiplexing device 107 is rate limited to the outbound TDM rate 101. In addition, the Internet Router 111 provides the necessary Quality of Service functionality which ensures that the voice traffic takes precedence over any other outbound traffic.

The remote station 103 will support both voice and data however when voice is running there is a requirement that the data takes less precedence in both directions. This is achieved by the Internet Router 111 giving higher precedence to the voice traffic in the forward link, however in the return link the remote station must provide this traffic shaping. For the remote station solutions which utilise a PC and soft-phone it would be advantageous if the operating system ensured that the voice traffic was given preference. However in practise due to limitations in common PC operating systems, the remote station will receive all traffic from the PC and then ensure that the voice traffic takes precedence over the radio channel. This requires the embedding of equivalent functionality to that which is in the Internet Router in the remote station 121.

The remote station will provide different interfaces so as to support dedicated IP phones, Analogue Phone adapters as well as soft phones running on personal computers.

The standard RADIUS server 113 is used to generate Call Data Records (CDR's) for all data sessions such that the end remote station user may be charged on the basis of remote station usage which may either be time or data packet based billing or both.

The network operation may be further improved by the introduction of channel frequency and code reassignment commands to move users between frequency channels to balance the load on the network. This includes the capability of the remote station channel frequency, time and code assignments in the data base being updated over the Outbound channel satellite link using a defined protocol to ensure no erroneous data is stored in the remote station.

The network operation may be further improved by a congestion control flag on the Outbound channel which is used to notify when the network capacity is being exceeded and will include the capability for different priority of users to be stopped accessing the network.

The network operation may be further improved by the use of ALOHA burst packet mode signalling channel using dedicated channel CDMA code sequences, on both the Outbound and the Inbound link for remote stations based on conventional burst mode signalling channel operations e.g. channel access request, channel access grant etc. The major advantage of this network operation is that an "always on" active session could be maintained.

FIG. 12 shows one example 900 of radio resource allocation, comprising a frequency, time and code resource structure for use within the satellite star network 1800 consisting of multiple remote stations operating through one or more central station. As an example of one method of sharing the inbound spectrum, four return channel bandwidth allocations f1-f4 respectively are divided into 16 equal duration timeslots that are respectively referred to as Timeslot 1, Timeslot 2, . . . , Timeslot N, Timeslot 16. Each timeslot is allocated a maximum of five orthogonal spread spectrum codes that are respectively referred to as Code 1, . . . , Code 5 in the code space.

Using this TDMA/CDMA multiple access arrangement, each inbound frequency allocation 101 provides 80 'channels'. Using the disclosed distributed resource management technique, the remote station 119 selects a channel, defined by frequency, timeslot and code sequence, and enables the modem 100. At the central station multi-user detection signal processing techniques are applied to the received signal at the inbound channel unit (106) associated with the selected frequency to recover the received user information. The inbound waveform comprises a complex valued code sequence with BPSK or QPSK modulation with turbo product codes;

As four channels are allocated to each outbound channel, and with the application of TDMA and CDMA techniques, up to 250 active users may access the radio network 1904 at any one time using the set of four inbound channels.

An advantage of using a spread spectrum return channel is that the network capacity has a soft limit whereby as additional users try to operate on the return channel, a gradual reduction in network throughput occurs as the self-interference increases beyond the design limit causing channel error. This property of CDMA facilitates the simplification of the resource selection algorithms in the remote station. A further advantage is that the remote station antenna requirements, for meeting "off axis" flux density transmit EIRP regulatory requirements are simplified by signal spreading.

The form of the disclosed arrangements is described for remote stations operating within a star network topology using satellites operating in the geostationary arc, and remote stations that operate within the C Band (eg 4 to 6 GHz) frequency allocation. The remote stations, which may be fixed, portable or mobile equipment depending upon the remote station antenna configuration, communicate over duplex satellite links with a central station that acts as a Network Gateway into the terrestrial network (see FIGS. 1 and 2 below). This terrestrial network may comprise any form, but would typically use the Public Switched Telephone Network (PSTN), and Public Switched Packet Data Network (PSPDN), or generic public Internet or Corporate Intranet.

A Code Division Multiple Access (CDMA) scheme is employed on the radio link between the remote stations and the central station. Other multiple access techniques may be employed (eg. FDMA or TDMA) however CDMA is preferred as by using CDMA the resource selection algorithms that must be implemented in the remote stations are simplified. The remote stations are envisaged to operate with relatively low gain directional antennas, with gains varying between 15 and 30 dBi.

The disclosed arrangements depict a procedural system concept whereby through the use of distributed resource management and standard data network connected access session protocols, an on demand multiple access radio system may be implemented whereby radio resources are efficiently and effectively shared among multiple users and a central central station. The preferred method uses GPS receivers in the remote stations to derive their current resource domain and automatically select channel access frequencies and codes using the current resource map, additionally GPS allows the remote station to provide satellite timing and path delay compensation in accessing the central station so simplifying the central station CDMA receiver implementation. Using the aforementioned techniques an on demand multiple access scheme providing efficient resource management may be implemented, without the need for specific centralised DAMA radio network management facility, greatly simplifying the overall network design.

The system design also allows for portable and mobile remote station equipment which may not always support a connected session to the terrestrial network, by providing a layer three context using PPP and initiating communication with the remote station via a virtual paging channel statistically multiplexed onto the outbound TDM channel.

A seamless method of transferring any remote station operating within one resource domain to any other resource domain whether the new resource domain is associated with the same central station as the old resource domain or not.

INDUSTRIAL APPLICABILITY

It is apparent from the above that the arrangements described are applicable to the data communication industries.

The foregoing describes only some embodiments of the present invention, and modifications and/or changes can be made thereto without departing from the scope and spirit of the invention, the embodiments being illustrative and not restrictive.

Using Digital Video Broadcast Standards

Figure 13A:
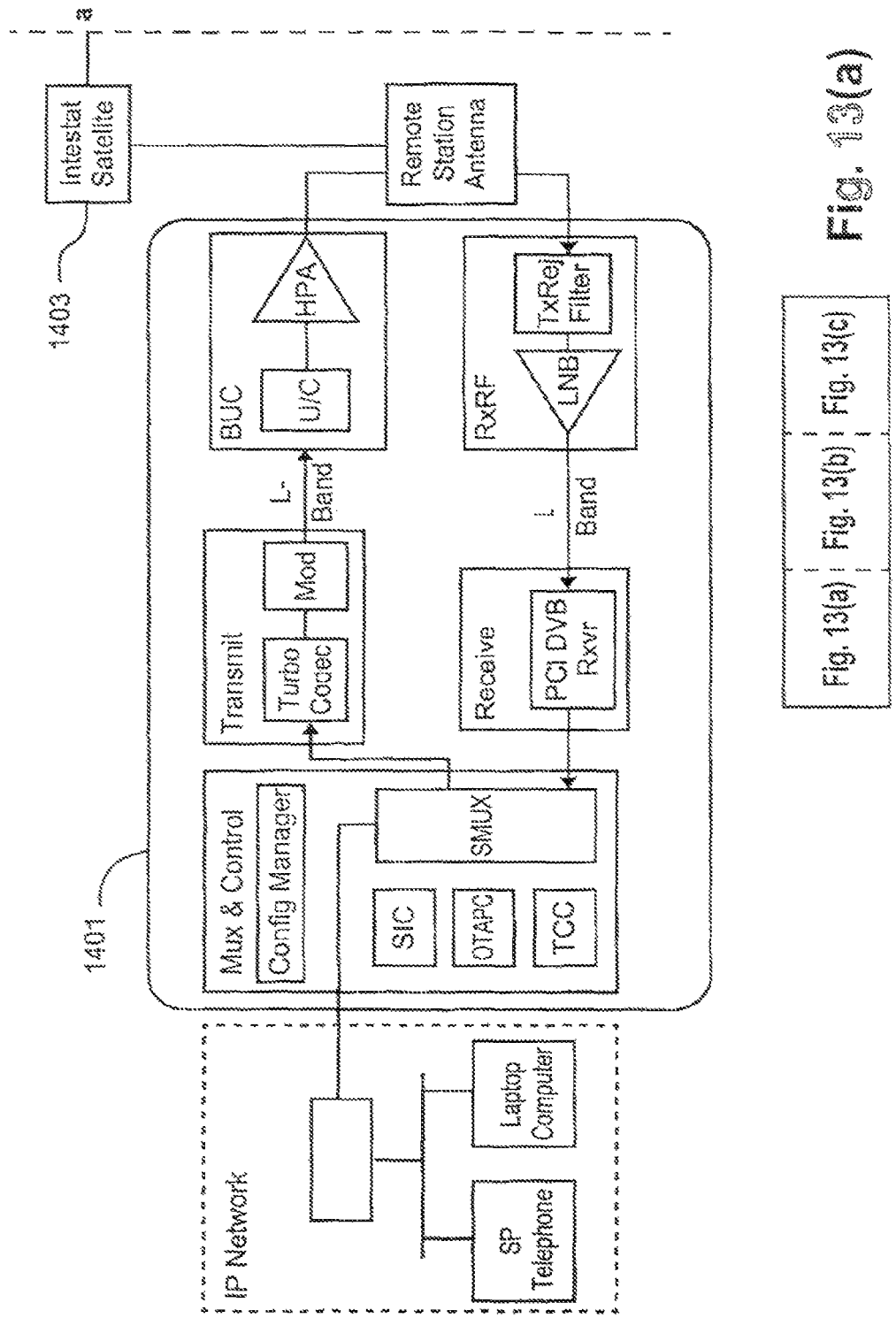
FIG. 13 shows Alternative Embodiment Network Architecture with Direct Video Broadcast (DVB)
Figure 13B:
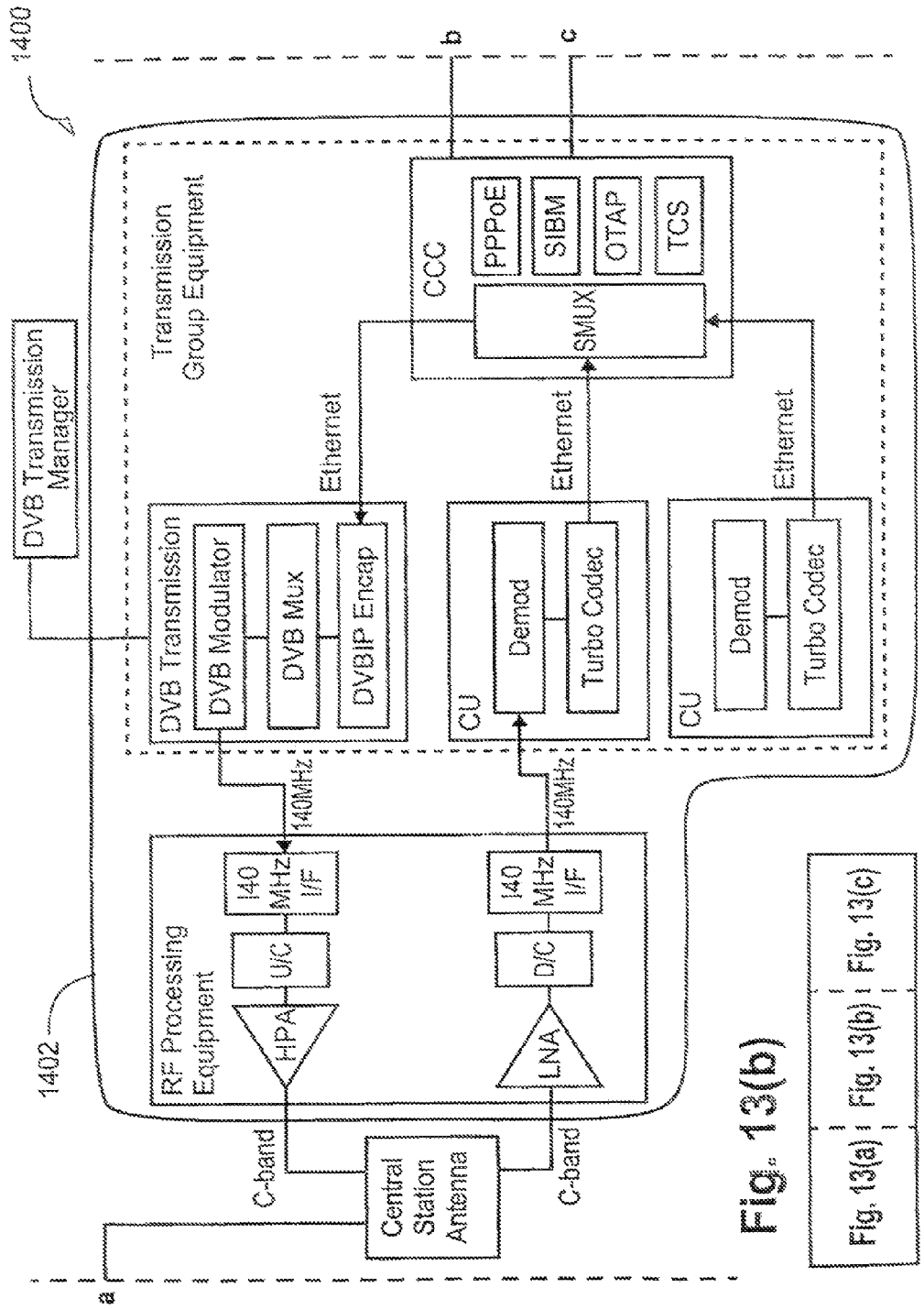

The distributed resource management technique may be practiced in a system using an outbound carrier that complies with the ETSI DVB-S physical and link layer requirements as illustrated in FIG. 13 which shows an alternative network architecture arrangement with DVB. This arrangement is preferred in the case where, due to operational reasons the outbound TDM transmit symbol rate was greater than 2 Msps.

At a central station 1402 the outbound TDM carrier is implemented with commercial off the shelf DVB-S transmission equipment and the outbound link layer structure and signalling is replaced with DVB multi-protocol encapsulation and the messages and tables described above are transported in private data sections.

At a remote station 1401 the proprietary receiver structure previously described is replaced with a commercial off the shelf DVB-S receiver printed circuit board. This card is capable of demodulating the DVB-S waveforms and supports the multi-protocol encapulation link layer.

Other Satellite Frequency Bands

Rather than the C band satellite system referred to in this description, the disclosed distributed resource allocation technique can be practiced using other satellite networks operating in other frequency bands. One such system is an L band mobile satellite system that operates at 1.5 to 1.6 GHz frequency band.

In such a network the detailed design of the air interface would be adapted to conform to the satellite operational requirements that would result in an equivalent service with an Outbound TDM narrowband (non spread spectrum) channel data rate at 640 kbps in 1.25 MHz bandwidth, and 1.25 MHz inbound channel spread spectrum system using nominal data rate 9.6 kbps.

Similar modulation and coding schemes would be used to the C band system except for the precise Turbo Convolutional codes and modulation types which could use different narrowband schemes including BPSK, QPSK, 16 QAM or even 64 QAM.

Using Other Network Topologies

The disclosed distributed resource management technique is equally applicable to networks using a multiplicity of overlapping 'star' network configurations each consisting of a central station providing connectivity to intelligent remote stations distributed amongst the various central stations.

APPENDIX A

Exemplary Central Station Implementation

Referring to FIG. 7, an exemplary central station implementation is described. The central station may be divided into four main functional entities, transmission group equipment 20, transmission group manager equipment 21, radio frequency processing equipment 22 and IP networking equipment 12.

Transmission Group Equipment

The transmission group equipment 20 consists of channel units 4 and channel control cards 5, a combiner/divider 7, traffic 2 and control 3 switches and a timing reference from a GPS receiver and NTP server 1. The GPS receiver and NTP server equipment is not strictly part of the transmission group equipment as it may be shared among multiple transmission groups it has been included to simplify the description. Pilot receivers 11 are required for low bit rate applications.

Channel units are the physical layer modems while the channel control card is a multi-function card providing link layer processing of traffic and control signals. Transmission groups are operated on cPCI cards inside a cPCI chassis and control and traffic data is separated through the different switches (e.g. subnetting).

The following paragraphs provide a more detailed description of the elements that make up the traffic group equipment.

Channel Unit 4: Physical layer MODEM, the MODEM consists of direct to L-Band modulation, direct to L-Band demodulation, digital to analogue conversion, analogue to digital conversion, receive base-band processing, and transmit base-band processing functions. The MODEM is frequency agile and is capable of tuning the receiver and transmitter independently in steps of 25 kHz. The MODEM may be configured to operate with narrowband, or direct sequence spread spectrum QPSK or BPSK modulated waveforms.

The channel unit also contains a turbo codec. The Turbo Codec is a highly configurable software implementation of a standard Turbo Product Codec. The turbo codec provides both encoding and decoding functions and supports coding rates in the range of 0.25 to 0.97 and block sizes from 64 bits to 4096 bits. The BER performance of the demodulator and turbo decoder combination is less than 1 bit error in 1 million bits at an $E_b/N_0$ of 2.0 dB Channel Control Card 5: A link layer processor providing traffic services to all channel units. The channel control card is an off the shelf high availability rack mounted single board computer and hosts the session multiplexer, remote station control manager, the service information broadcast manager and the over the air programming manager processes. The transmission group equipment operates with a redundant pair of channel control cards within a single chassis. The channel control card uses the Linux operating system along with the high availability extensions. The distributed resource management protocols form part of the remote station control manager, and service information broadcast manager processes.

GPS 1/Pilot Receiver 11: GPS and Pilot signals are distributed to the channel units to provide highly stable timing and frequency references. The NTP protocol is used to synchronise the real time clocks in all the distributed processors operating within the central station.

Combiner/Divider 7: The combiner divider is a set of broadband radio frequency devices that include passive signal dividers, combiners and amplifiers operating within the L-Band frequency band (950 MHz-1525 MHz). The combiner divider provides a loss less path from each channel unit receive and transmit radio frequency interface port to every intermediate frequency receive and transmit interface port on the radio frequency equipment.

Traffic Switch 2: A commercial off the shelf Ethernet switch. All traffic packets from the router are distributed to the operational channel control card through this device.

Control Switch 3: A commercial off the shelf Ethernet switch. All control messages between the transmission group manager equipment, the channel units, operational and standby channel control cards and the pilot receivers traverse this switch.

Transmission Group Manager Equipment

The traffic group manager equipment 21 consists of a database server, a personal computer and an Ethernet switch. The Ethernet switch is used to provide LAN interconnectivity between the traffic group manager equipment and all other pieces of equipment that make up the central station.

The database sever 9 consists of a high end personal computer with mirrored hard drives, back up media drives (e.g. DVD writer) and an Ethernet interface. The database server uses the Linux operating system and MySQL.

The traffic group manager 10 is a software application executing on a high end personal computer executing the Linux operating system. The traffic group manager provides fault management, alarm management, configuration management, performance management and provisioning services. The traffic group manager uses SNMPv3 to provide communication between the management functions and the elements that comprise the central station.

IP Network Equipment

The IP network equipment consists of the router 13 the SIP 17, DNS 16 and RADIUS 15 servers and an Ethernet switch 14.

The following paragraphs provide a more detailed description of the elements that make up the IP network equipment.

Router: The router is standard commercial off the shelf equipment. Key router functions are to manage stream bit rates per outbound, provide MLPPP services, manage PPP Sessions, provide interfaces to external networks, (e.g. PSTN/Internet) and the SIP, DNS and RADIUS servers.

SIP Server: A software process running on a personal computer. The implementation uses an open source SIP proxy function, registration and redirection functions. The SIP server supports the session initiation suite of application level protocols the are use to prove call establishment signalling for the establishment of VoIP sessions.

DNS Server: A software process running on a personal computer. The implementation uses an open source DNS application.

RADIUS Server: A software process running on a personal computer. The implementation uses an open source RADIUS application. The RADIUS application is used to provide authentication, authorisation and accounting services.

Radio Frequency Processing Equipment

The radio frequency processing equipment 22 consists of an antenna 18, and L-Band to C-Band receiver and transmitter chains 19. In the preferred embodiment an earth station operator provides the radio frequency processing equipment and the central station provides appropriate L-Band interface points only.

APPENDIX B

Exemplary Implementation of a Remote Station

Figure 2:
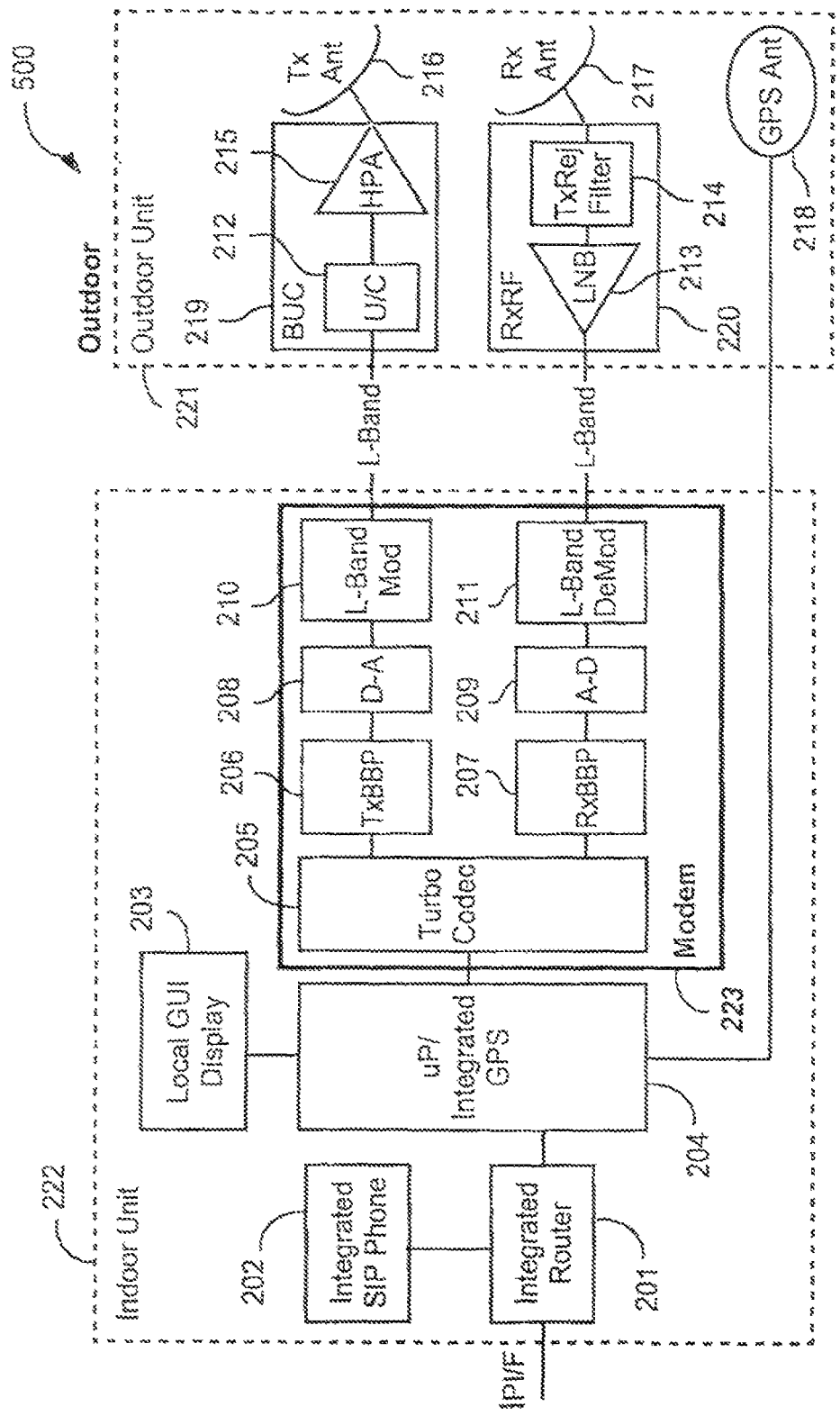
FIG. 2 shows an exemplary remote station architecture (also see APPENDIX B)

Referring to FIG. 2 an exemplary remote station implementation is described. The remote station may be divided into two main functional units, the outdoor unit, and the indoor unit.

The indoor unit 222 is comprised of the following functional entities:
1. An Ethernet IP Interface point;
2. Integrated VoIP telephone 202;
3. Embedded IP router function 201;
4. Control processor function 204;
5. Integrated GPS receiver 204; and
6. A modem 223 providing receive a transmit modulation and demodulation functions.

The outdoor unit 221 is comprised of the following functional entities:
1. L-Band to C-Band block up converter 219;
2. Transmit antenna 216;
3. Receive antenna 217;
4. Receiver radio frequency functions 220; and
5: omni-directional GPS receive antenna 218.

Indoor Unit Functional Description

The indoor unit provides the following functions:

Ethernet IP Interface: The primary user interface for data transfer and maintenance and control. The interface complies with the 10/100 baseT auto-detecting interface requirements and is accessed using a standard RJ-45 connector.

Integrated SIP Phone 202: A standard commercial off the shelf voice over IP device that provides voice compression using G723.1 and G.729 voice codecs and supports the session initiation protocol. Inter-works with the SIP server located at the central station to allow connections to be established between the remote station and VoIP or PSTN networks via the router in the central station.

Microprocessor 204: The microprocessor provides the background processing for the unit. All management and control functions as well as air interface protocols are executed here. The microprocessor operating system is a PC based Linux distribution, kernel 2.4.x. The microprocessor has both link layer and network layer (e.g. IPv4) addresses so that data can be routed to the remote station. The processor also provides control of the local backlit LCD graphical user interface display 203.

Integrated router 201: As the microprocessor operating system is a Linux distribution the integrated router is implemented by installing the appropriate Linux routing daemons. The imbedded router function provides PPP, MLPPP, NAT, DHCP and IPv4 policy routing functions.

GPS 204: The GPS unit provides location specific information and reference timing to the remote station for burst mode transmission. The remote station can operate without a GPS unit with manual entry of latitude, longitude and altitude but will have to operate with restricted burst transmission plans.

Turbo Codec 205: The Turbo Codec is a highly configurable software implementation of a standard Turbo Product Codec. The turbo codec provides both encoding and decoding functions and supports coding rates in the range of 0.25 to 0.97 and block sizes from 64 bits to 4096 bits. The BER performance of the demodulator and turbo decoder combination is less than 1 bit error in 1 million bits at an $E_b/N_0$ or 2.0 dB.

Modulator/Demodulator (MODEM) 223: The MODEM consists of direct to L-Band modulation 210, direct to L-Band demodulation 211, digital to analogue conversion 209, analogue to digital conversion 209, receive base-band processing 207, and transmit base-band processing 206 functions. The MODEM is frequency agile and is capable of tuning the receiver and transmitter independently in steps of 25 kHz. The MODEM may be configured to operate with narrowband, or direct sequence spread spectrum QPSK or BPSK modulated waveforms.

Outdoor Unit Functional Description

The outdoor unit provides the following functions:

Block Up-Converter 219: The block up-converter comprises an up-converter function 212 and a nominal five watt, at the 1 dB gain compression point, solid state high power amplifier 215. The up-converter provides frequency up-conversion from the L-Band IF frequencies to C-Band transmit frequencies. The solid state high power amplifier when combined with the transmit antenna provides an effective isotropic radiated power of 26.5 dBW.

Receive radio frequency processing 220: The receive radio frequency processing comprises a transmit rejection filter 214 and a low noise block 213. The transmit rejection filer provides a minimum of 30 dB of attenuation to signals in the 6 GHz transmit band. The low noise block provides frequency down-conversion from C-Band to L-Band and Low Noise amplification of the RF signal. The combination of the LNB and receive antenna provide a nominal receive G/T of −1.5 dB/K.

Transmit antenna array 216: A phased array of circularly polarized helices that provide a nominal 23 dBi gain in the 6 GHz frequency band.

Receive antenna array 217: A phased array of circularly polarized helices that provide a nominal 21 dBi gain in the 4 GHz frequency band.

GPS Antenna 218: A commercial off the shelf omni directional antenna for use in the global positioning system.

APPENDIX C

Exemplary Physical Layer Architecture

Figure 14:
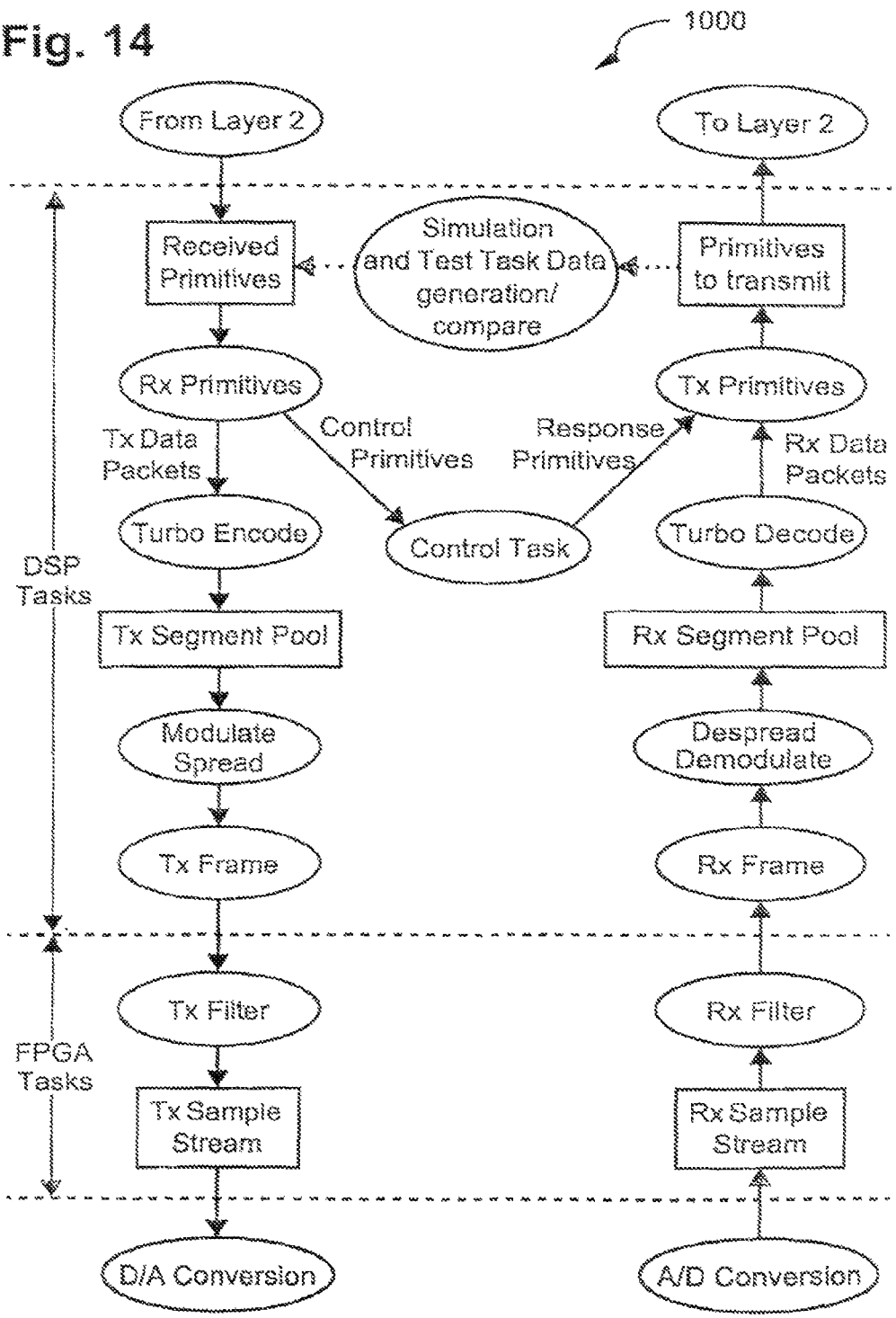
FIG. 14 shows an example of a physical layer architecture that can be used in the network of FIG. 1.

The physical layer architecture is the same for both the inbound and outbound channels. The base-band processing is implemented within software using DSP and programmable gate arrays and is illustrated in FIG. 14.

Although the same physical layer structure is used on both the inbound and outbound channels in the preferred embodiment this decision was based upon the provision of medium level bit rates on the outbound channel (e.g. less than or equal to 2 Mbps). In the case where network operations required high outbound bit rates (e.g. greater than 2 Mbps) then the outbound physical layer architecture would be replaced with the DVB-S standard physical layer architecture, the inbound physical layer architecture would however remain unchanged.

Transmit Direction Tasks

The RxPrimitives Task receives primitives sent asynchronously by the link layer and places them in a buffer it then examines each received primitive to determine the type. If the received primitive is a control primitive, the primitive is passed on to the Control Task for processing. If a transmit packet primitive, it is passed on to the Encode Task for processing.

The transmit packet primitives that are processed by the Encode Task contain the following information;

Channel Type ID

Number of segments over which packet will be divided

For each segment, the Frequency, Frame, Slot and Code to use

Uncoded data to be sent

The Turbo Encode Task uses the Channel Type ID to determine how to encode the packet; and performs the following processes (as required);

Turbo-encoding

Puncturing

Interleaving

Formatting

The Turbo Encode Task then divides the resulting encoded/formatted bits into groups to be transmitted in each of the specified segments, and inserts the bits for each segment into the appropriate 'Tx Segment Pool'. A separate Segment Pool is used for each frequency being handled by the modulator.

Figure 15:
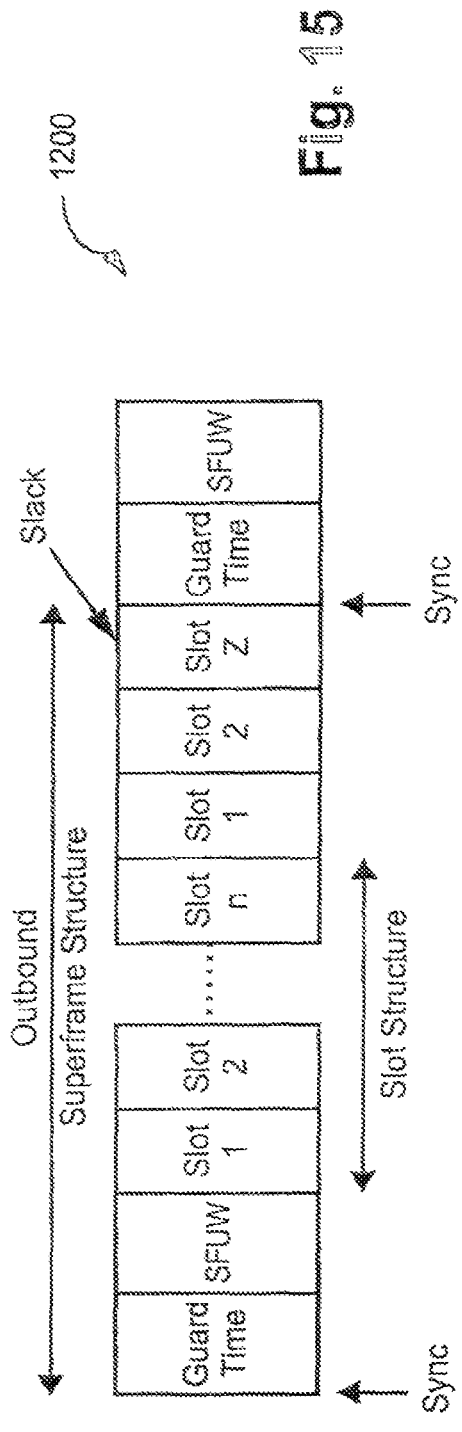
FIG. 15 shows an example of an Outbound Super-frame Structure.

The TxFrame Task uses the super-frame format description associated with the channel it is processing, to generate output slots of the correct durations and types, in the correct sequence. The task follows a state machine approach to generate the chips required for the duration of the current slot. FIG. 15 shows a graphical illustration of the fields contained in the super-frame structure table for the outbound super-frame structure.

When the TxFrame Task determines that it should be outputting chips for a data slot, it sends a request to the Modulate/Spread Task.

The Modulate/Spread task on receipt of this request scans the Segment Pool to see whether data is available for the specified frame and slot. If not, it replies to the TxFrame task accordingly, and the TxFrame task generates silence in that slot. If data is available, then the Modulate/Spread task will create a buffer to contain the chips for the slot, and inform the TxFrame task of the corresponding buffer management object.

Note that several segments (using different codes) may be due for transmission on the same frequency in the nominated frame/slot. The Modulate/Spread task (instantiation for the given frequency) modulates and spreads the data for all of these segments, (synchronously) combines the resulting chips via addition, and places the chips in its output buffer.

The TxFrame task then transfers the chips produced by the Modulate/Spread Task into its output chip stream.

The TxFilter task is implemented within an FPGA and processes the stream of chips produced by the TxFrame task, to perform
  Expansion to multiple samples per chip via repetition
  Nyquist filtering Receive Direction Tasks The RxFilter task performs Nyquist filtering of the input samples and passes the filtered samples to the RxFrame Task.

Figure 16:
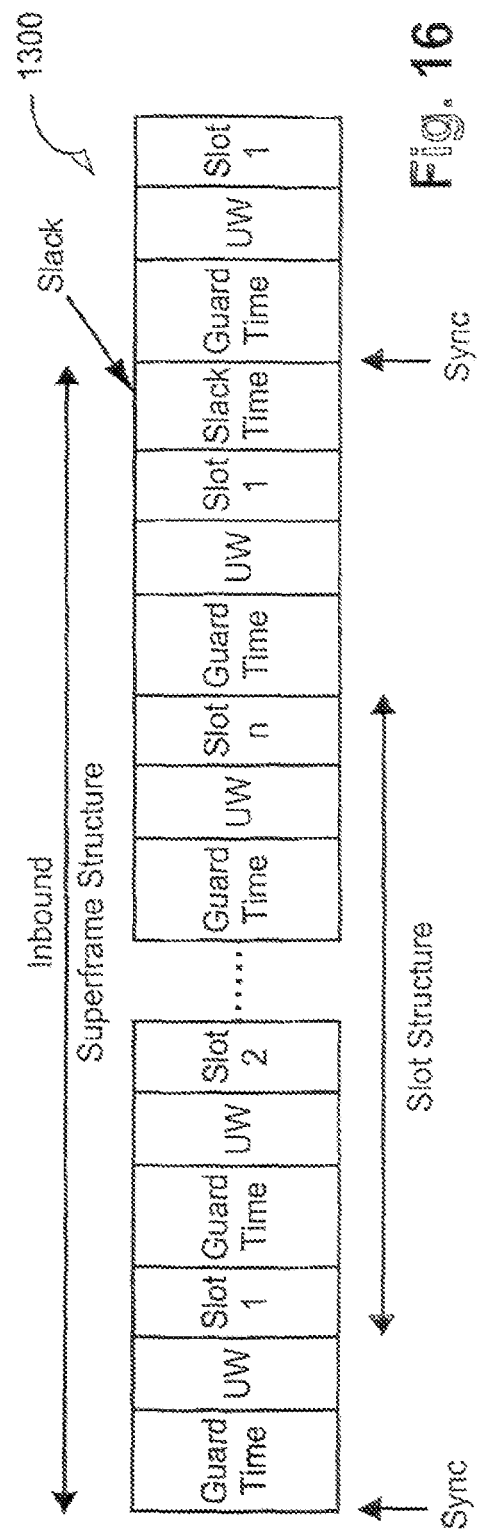
FIG. 16 shows an example of an Inbound Super-frame Structure.

The RxFrame task uses the super-frame format description associated with the frequency it is processing, to process input slots of the correct durations and types, in the correct sequence. The task follows a state machine approach to process the samples required for the duration of the current slot, and then checks to see what the next type of slot to receive should be. FIG. 16 shows a graphical illustration of the fields contained in the super-frame structure table for the inbound super-frame structure.

The RxFrame task uses GPS and waveform processing (UW search) to acquire and maintain the initial slot boundaries within the incoming sample stream.

When the RxFrame task determines that it should be receiving samples for a data slot, it sends a request (via mailbox) to the Despread/Demodulate task.

The Despread/Demodulate task on receipt of this request scans the list of expected segments for the appropriate frame number to see whether the slot needs to be processed. If not, it replies to the RxFrame task accordingly, and the RxFrame task discards the samples received for that slot. If the slot is to be processed, then the Despread/Demodulate Task creates a buffer to contain the input samples for the slot, and the RxFrame task will place the input samples into that buffer.

The Despread/Demodulate task processes the input samples for the data slot and performs;
  Fine timing estimation (picking sample point corresponding to middle of chip)
  Frequency offset estimation/correction
  Initial phase acquisition
  Despreading
  Demodulation where demodulation consists of using the symbol constellation to calculate the Log-Likelihood Ratios (LLR) for each received bit. This process also involves received noise power estimation.

Note that several segments (using different codes) may be due for reception on the same frequency in the nominated frame/slot. The Despread/Demodulate task (instantiation for the given frequency) despreads and demodulates the samples for all of these segments.

For each received segment for the slot, the Despread/Demodulate task places the buffer of LLRs it produces into the Receive Segment Pool, and notifies the Turbo Decode task that a new segment has been added to the pool.

The Turbo Decode task scans the pool to determine whether the new segment added is the last segment that is required to have all the segments that belong in the same packet. Note that these segments may arrive on multiple frequencies, and/or multiple timeslots, and/or multiple codes. If it is the last segment required, then the Turbo Decode Task re-assembles the segments for the packet, and then performs (as required);
  Formatting
  De-Interleaving
  De-Puncturing
  Turbo-decoding The Receive Segment Pool is implemented as a linked list, an entry of which contains the LLRs for a particular received segment. Unlike the transmit side, a single Receive Segment Pool is used to contain segments received on all frequencies.

The Decode task composes a receive packet primitive that contains the
  Packet ID
  Decoded packet data
  Signal quality information The receive packet primitive is passed via the TxPrimitives task to the link layer. The role of the TxPrimitives task is to merge user data packets from the Decode task with response primitives generated by the Control Task and to send the resulting primitives to the link layer.

Although the above tasking model is designed with burst mode transmission in mind, continuous transmission mode is handled by having the Demodulate/Despread task maintain state information from one timeslot to the next. In this case the RxFrame task effectively passes all received samples to the Demodulate/Despread task for processing.

APPENDIX D

Exemplary Link Layer Architecture

Figure 17:
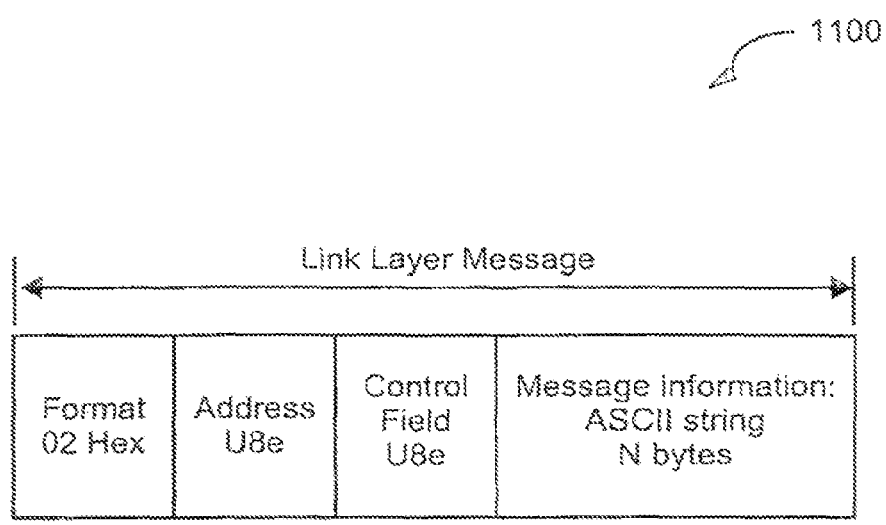
FIG. 17 shows an example of a link layer message format that can be used in the network of FIG. 1.

An illustration of the link layer signalling message format is described. The link layer protocol is based upon HDLC and uses the standard flag sequence (7E hexadecimal) to delineate frames and a sixteen bit frame check sequence to provide error detection as shown in FIG. 17. The position of the link layer within the system protocol framework is illustrated in FIG. 11. The same link layer protocol is used on the inbound CDMA/TDMA channels and the outbound TDM channels. Although the same link layer protocol is used on both the inbound and outbound channels this decision was based upon the provision of relatively low bit rates on the outbound channel (e.g. bit rates less than or equal to 2 Mbps). In the case where network operation required higher outbound bit rate operation then the outbound link layer protocol would be replaced with the DVB-S standard link layer protocol.

The link layer is operated using the asynchronous response mode of the HDLC protocol and provides both control message transfer and user data transfer services. The link layer frame consists of a variable length header followed by a variable length data field that contains either IP packets or control messages, or both followed by a sixteen bit frame check sequence.

The link layer specific remote station address is carried within an extensible field within the header portion of the link layer frame. The address is variable in length from one byte to N bytes. The length of the address is determined by examining the most significant bit of each byte. If the most significant bit is '0' then the next byte is part of the address otherwise this byte is the last or only byte in the address. Using this method broadcast, multicast and unicast link layer addressing is supported.

APPENDIX E

Exemplary Resource Management Protocol

The distributed management protocol is implemented in software in the microprocessor and channel control cards within the remote stations and central station respectively. Although only one method of implementing the distributed resource management protocol is described, there are numerous other methods that may implement the protocol equally well.

Throughout this section numeric types are specified using the following format:

| <Sign> <Length> <Extensibility> | |
|---|---|
| Field | Options |
| Sign | U = unsigned, S = signed |
| Length (bits) | 1 ... N |
| Extensibility | appending an 'e' to a type indicates that the field is extensible. See below for a full description of how field size extension works. |

Examples:

| | |
|---|---|
| S4 | Signed 4 bit integer |
| U3 | Unsigned 3 bit integer |
| U16 | Unsigned 16 bit integer |
| U8e | Extensible unsigned 8 bit integer |

Extensible Numeric Fields

The MSB in these fields is used to determine if the data field is extended. If the MSB=1 then the field contains the number of bits as specified in the base type (ie. An U8e contains 7 bits of significance). A MSB=0 means the field length is extended by the same length as the original field (i.e. by a further 8 bits in the case of U8e, etc.). The MSB of the extended field can be used to extend the data field indefinitely.

Messages Used for Distributed Resource Management

The remote station specific (i.e. unicast) link layer signalling associated with the distributed resource management process is transported across the satellite link as a part of the link layer service in the form of messages. These messages are transported using a unique link layer address assigned to the remote station as part of the provisioning process. The message format used on the link layer is as illustrated in FIG. 11.

The communication network may require additional messages to be signalled from the remote station to the central station to support the offered communications services. The messages described in this section are however limited to those required to implement the preferred arrangements of the distributed resource allocation method.

The Control field contained in the inbound link layer message defines the 'frame type' it is of type U8 and is interpreted as shown in the following table. The bit in position 4 is unused and its value shall be set to '0' by the transmitter and ignored by the receiver.

TABLE

Inbound Link Layer Message Control Field Interpretation

| | MSB | | | | | | | LSB |
|---|---|---|---|---|---|---|---|---|
| Frame Type | 7 | 6 | 5 | 4 | 3 | 2 | 1 | 0 |
| Unnumbered | x | x | x | | x | x | 1 | 1 |
| SARM | 0 | 0 | 0 | | 1 | 1 | 1 | 1 |
| DISC | 0 | 1 | 0 | | 0 | 0 | 1 | 1 |

TABLE-continued

Inbound Link Layer Message Control Field Interpretation

| | MSB | | | | | | | LSB |
|---|---|---|---|---|---|---|---|---|
| Frame Type | 7 | 6 | 5 | 4 | 3 | 2 | 1 | 0 |
| UI | 0 | 0 | 0 | | 0 | 0 | 1 | 1 |
| UA | 0 | 1 | 1 | | 0 | 0 | 1 | 1 |

The following message information fields are used for signalling in support of the distributed resource management process:

radio resource notify: Radio resource notify message is sent from the remote station to the central station on the selected inbound channel using the SARM frame type.

null: A 'null' message is sent from either the central station or the remote station in response to a received message using the UA frame type. The 'null' message consists of an address field, control field, and an empty message information field. The receiving station interprets the receipt of this message as an acknowledgement from the transmitting station of the successful receipt and action of the most recent received command.

resource release notify: Resource release notify message is sent from the remote station to the central station on the selected inbound channel using the DISC frame type.

Outbound Tables that Comprise the Resource Map

Further outbound link layer signalling associated with the distributed resource management process is transported across the satellite link as a part of the link layer service in the form of broadcast tables. These tables are transported using the link layer broadcast address (FF hexadecimal). The communication network may require additional system information to be signalled from the central station to the remote station to support the offered communications services. The tables described in this section are however limited to those required to implement the preferred arrangements of the distributed resource allocation method.

The distributed resource management process at the remote station requires two sets of information in order to operate, a resource domain database and a resource map database. In the preferred embodiment this information is transferred to the remote stations using the following table structures:

resource domain table;
transmission group table;
channel structure table;
super-frame structure table; and
channel availability table.

The resource map is derived from information contained within the transmission group, channel structure, super-frame structure, and channel availability tables. Of these four tables only the information contained in the channel availability table changes dynamically, the information contained in the remaining three tables may be considered static in nature. The information contained in the resource domain table may also be considered as static.

Each table that contains static information is broadcast periodically on the outbound TDM channel. The periodicity of these broadcasts is configurable and ranges from once in every 10 seconds to once in every 1000 seconds. The channel availability table contains information that is dynamic in nature and therefore it is transmitted either immediately following an update or periodically in a configurable range from once in every 1 second to once in every 100 seconds whichever is shorter.

Resource Domain Table

The resource domain table provides the information from which the remote station may derive its current resource domain. The remote station uses this table and knowledge of its geographic position to determine its resource domain by calculating the distance between its current position and the geographic positions contained in the table. The remote station then determines the closest point in the table to its current position and uses that point to retrieve the associated resource domain value from the table.

TABLE

Resource Domain Table Format

| Parameter | Format |
|---|---|
| Coordinate | U12, U12 |
| DomainID | U8e |

Coordinate: The latitude and longitude of a geographic position located within the referenced resource domain.

Coordinate information is transferred latitude and then longitude, both as unsigned 12 bit fields and interpreted as defined in the following table.

TABLE

Coordinate Interpretation

| Item | Description |
|---|---|
| Latitude Range | −90 to +90 degrees |
| Latitude Algorithm | Latitude = −90° + U12 × 0.05° |
| Longitude Range | −180 to +180 degrees |
| Longitude Algorithm | Longitude = −180° + U12 × 0.1° |

DomainID: The unique resource domain ID that can be referenced in other tables.

Transmission Group Table

The transmission group table lists all of the transmission groups that may be available for use, where a transmission group is defined as the set consisting of a single outbound TDM carrier and a multiplicity of inbound carriers operating through a single geostationary satellite.

TABLE

Transmission Group Table Format

| Parameter | Format |
|---|---|
| Satellite Resource | Satellite Record |
| # of TGs | U8e |
| TG Resource | TG Record |

Satellite Record: A listing of the operational satellite through which the traffic group resource is available the format of the satellite record is contained in the following table.

TABLE

Satellite Record

| Parameter | Format |
|---|---|
| Longitude | U10 |
| Polarisation | U2 |

Longitude: This field represents the longitude of the satellite from 0 to 360 degrees. The 10 bits are transmitted MSB and the position of the satellite is:

$Sat_{Long} = U10 \times 0.5°$

Polarisation: The polarisation is always referred to with respect to the remote station transmission reception requirement. Hence an O/B carrier defined as RHCP means that the downlink is RHCP. An inbound LHCP means that the uplink is LHCP. The coding of the polarisation field is defined in the following table.

TABLE

Polarisation

| Value | Description |
|---|---|
| 0x00 | Inbound RHCP, Outbound RHCP. |
| 0x01 | Inbound LHCP, Outbound LHCP. |
| 0x02 | Inbound RHCP, Outbound LHCP |
| 0x03 | Inbound LHCP, Outbound RHCP |
| 0x04 to 0xFF | Reserved |

TG Record: A group of channel resources, namely one outbound and one or more inbound resources. It always identifies the O/B channel first and then iteratively identifies the I/B channels.

TABLE

Transmission Group Records

| Parameter | Format |
|---|---|
| TG_ID | U8e |
| O/B Channel Structure ID (CS_ID) | U8e |
| CDMACodeID | U8e |
| TDMACode | U8e |
| DomainID | U8e |
| # of IB Streams | U8e |
| I/B Channel Structure ID (CS_ID) | U8e |
| CDMACodeID | U8e |
| AccessType | U8 |
| # of TDMACodesTDMA | U8e |
| TDMACode | U8 |

TG_ID: This is a unique number that is used to represent the ID of the Transmission Group.

O/B Channel Structure: This is the specific Channel Structure ID (CS-ID) as determined from the channel structure table.

CDMACodeID: This is a specific code linked to the 'CodeSet' defined in the channel structure table.

TDMACode: This is the specific "TDMA Slot Pattern" to be transmitted and is linked to the super-frame defined in the channel structure table.

DomainID: The DomainID links a transmission group to a specific resource domain as defined in the resource domain table.

# of IB Channels: Describes the number of I/B channels associated to this transmission group.

I/B Channel Structure: This is the specific Channel Structure ID (CS-ID) as determined from the channel structure table.

AccessType: This field defines the type of service that operates on the channel. The coding of the 'AccessType' field is defined in the following table.

TABLE

Access Types

| Value | Description |
| --- | --- |
| 0x00 | Continuous carrier service. |
| 0x01 | Slotted Aloha Carrier. |
| 0x02 | TDMA/CDMA Carrier |
| 0x03 to 0xFF | Reserved for future use |

Channel Structure Table

The following channel structure table defines all the available inbound and outbound channels available for use in the network, where a channel is defined as the full set of configurable parameter that define the physical layer attributes of an inbound or outbound satellite communication resource.

TABLE

Channel Structure Table Format

| Parameter | Format |
| --- | --- |
| CS_ID | U8e |
| Frequency | U24 (BCD) |
| Modulation | U2 |
| Reserved | U6 |
| ChipRate | U8e |
| CodeSet_ID | U8e |
| Super-Frame_ID | U8e |
| Synchronization | U5 |
| RollOff | U3 |
| FEC_ID | U8e |

CS JD: A channel structure M.

Frequency: The BCD representation of the Centre Frequency ($F_c$) of the channel to where:

$F_c$=Frequency($BCD$)×10 kHz.

Modulation: Describes the modulation scheme used on these carriers.

TABLE

Modulation Field Coding

| Value | Description |
| --- | --- |
| 0x0 | BPSK. |
| 0x1 | QPSK. |
| 0x2 to 0xF | Reserved |

ChipRate: Describes the chip rate ($C_r$) used on the channel where:

$C_r$=ChipRate×256.

CodeSet_ID: Acts as a pointer into the CDMA code set database, this database is written into the remote stations static storage at the point of sale. The remote station uses the 'CodeSet_ID' as a key to search this database in order to retrieve the code generation parameters and code length associated with this 'CodeSet_ID'. The remote station calculates the channel symbol rate by dividing the 'ChipRate' value by the code length.

Super-frame_ID: A number that references the Super-frame structure used for TDMA burst timing synchronisation as defined in the super-frame structure table. If the Super-frame_ID is '0' the channel is continuous.

Synchronization: This field defines the cyclic synchronization alignment of a channel. On the outbound this corresponds to when the SFUW will be transmitted and for the inbound it determines at which point the inbound channels will align their UW.

Roll Off: Describes the channel roll off ($R_o$) factor where:

$R_o$=RollOff×0.05

FEC_ID: Acts as a pointer into the FEC parameter database, this database is written into the remote stations static storage at the point of sale. The remote station uses the 'FEC_ID' as a key to search the FEC parameter database in order to retrieve the FEC parameters associated with this 'FEC_ID' and uses these retrieved parameters to configure its FEC encoder and decoder for operation on the channel.

Super-Frame Structure Table

The super-frame structure table is shown in the following table. This table is used for both inbound and outbound channels with slightly different interpretations.

TABLE

Super-frame Structure Table

| Parameter | Format |
| --- | --- |
| Super-frame_ID | U8e |
| Synchronization (seconds) | U5 |
| Reserved | U3 |
| Guard-Time (chips) | U8 |
| SFUW/UW (symbols) | U8 |
| # of slots | U8e |
| Slot Size (bytes) | U8e |

Super-frame_ID: Represents the ID of the structure. The '0' value is reserved and shall not be used.

Synchronization: Represents the length of the super-frame in seconds. Valid lengths are 1-6, 10, 12, 15, 20 and 30 seconds. 7-9, 11, 13, 14, 16-19, 21-29 and 31 are reserved. 0 is used for continuous channels.

Reserved: Reserved fields are set to '0'.

Guard Time The length of the allocated guard time in chips.

SFUW/UW: Represents the length of the SFUW/UW in symbols.

# of slots: Defines the number of slots in this super-frame structure.

Slot Size: Defines the length of a slot in bytes.

For the outbound the table is interpreted as shown in FIG. 12 where the structure consists of "Guard Time", SFUW, a repetitive slot structure (Slot 1 to Slot N), and a final slot Z, being the slack slot size from the last full slot to the start of the next super-frame.

The super-frame length is defined by the synchronization parameter. Synchronization will occur at the satellite transponder every UTC minute (i.e., UTC XX:XX:00.000). A super-frame length of 1 second will result in synchronization occurring every second there after, alternatively a super-frame length of 2 seconds would result in super-frame synchronization aligning every 2 seconds thereafter. Super-frame lengths of 1, 2, 3, 4, 5, 6, 10, 12, 15, 20, 30 are readily available.

A 5 bit field allows synchronization times up to 30 seconds although careful manipulation of slot sizes, SFUWs and guard times is necessary to minimize slack time.

The inbound super-frame structure is similar to the outbound except that a guard-time a unique word (UW) are transmitted at the beginning of each slot, as illustrated in FIG. 16. Any mismatch between the super-frame structure and slot allocation results in "slack time" which exists at the end of the super-frame.

Inbound synchronization operates in much the same way as the outbound with the super-frame length being an integer representing the time duration of the frame.

Channel Availability Table

The channel availability table is a dynamic table containing the current availability of Inbound Channels. The table shall be padded out to the nearest byte and the format of the table shall be as defined in the following table.

Table: Channel Availability Table Format

| Parameter | Format |
| --- | --- |
| TG_ID | U8e |
| # TG Flag bytes | U8e |
| Channel Flags (0 = Unavailable, 1 = available) | U1 |

Note:
The end Channel flag are padded with zeroes to the next byte boundary.

TG_ID: Transmission Group identifier.

TG Flag bytes: the number of bytes that follow (where each byte contains eight individual Channel Flags).

Channel Flags: A list of single bits, where each bit represents the availability of a channel (0=Unavailable, 1=Available). The MSB of the first byte corresponds to channel 0 within that Transmission Group. The next bit corresponds to channel 1, etc. The channels flags are in the order they are ordered in the transmission group table.

Compelled Sequence Protocol

A compelled sequence protocol is implemented within software at both the remote station and the central station as described in the SDL diagrams contained in FIGS. 8-10.

The remote station derives its position accurately, using GPS. The remote station then determines its resource domain by calculating its distance from a set of points contained in the resource domain table. The point closest to the remote stations position defines its resource domain (eg. Domain ID)

The remote station then uses its Domain ID as a key to enter the TRANSMISSION GROUP table to retrieve the set of parameters that define the outbound channel specific to the resource domain. In the preferred embodiment these parameters are frequency, symbol rate, modulation type and spreading code sequence. Although one combination of parameters from which the distributed resource allocation method may be implemented is described, there are numerous other combinations that may implement the distributed resource allocation method equally well.

Using these parameters the remote station configures its receiver to receive the outbound TDM.

Upon acquiring that outbound TDM channel the remote station demodulates the signal and ensures that it has locked on to the appropriate Outbound TDM by reading the link layer broadcast signalling tables contained therein.

The remote station now monitors all outbound TDM channel slots to collect the link layer signalling tables that comprise the resource map information specific to its current resource domain and stores this information in dynamic storage (see procedure 5 in FIG. 8).

The remote station continuously monitors the outbound TDM channel to detect any updates to the resource map information (see procedure 5 in FIG. 8).

When the remote station has received all the information contained in the link layer signalling tables the remote station distributed resource management process enters the 'idle' state (see procedure 6 in FIG. 8).

Following the receipt of a request to establish a connection (see procedure 7 in FIG. 8) from the user using either manual or automatic means (e.g. using a PC connected to the remote station the user requests the establishment of a PPP connection using a commercial off the shelf PPP dial up software package) the remote station selects an inbound radio channel (see procedure 26 in FIG. 9). In the preferred embodiment the parameters that define an inbound channel are frequency, symbol rate, modulation type, burst timing and spreading code sequence. Although one combination of parameters from which the distributed resource allocation method may be implemented is described, there are numerous other combinations that may implement the distributed resource allocation method equally well.

The remote station configures its transmitter using the selected parameters that defined the inbound channel, and commences the transmission of energy bursts over the selected inbound channel. Each burst contains a link layer resource notification message. The link layer message contains the link layer address of the remote station and a session ID that indicates a new session request. The link layer message is also used to convey PPP request packets received from the user and used to initiate a PPP session establishment procedure at the central station router.

Upon receipt of the resource notification (see procedure 43 in FIG. 10) containing the selected inbound resource identification and domain information the central station verifies that there is not a collision by examining its local copy of the channel availability table and checking that the selected resource is indeed available for use.

In the case where the selected resource is available the central station updates the channel availability table (see procedure 48 in FIG. 10) and immediately broadcasts the updated channel availability table to all remote stations (see procedure 49 in FIG. 10) in the network using the link layer broadcast address (7F hexadecimal) on the outbound TDM channel specific to the effected resource domain.

The central station also creates a routing context (see procedure 51 in FIG. 10) such that the current and any further received PPP packets received from the remote station may be routed from the selected inbound channel unit to the standard router and from the standard router to the channel unit transmitting the carrier that contains the selected outbound TDM channel.

The receipt of PPP session establishment packets at the central station router cause the central station router to attempt to acknowledge their receipt using standard PPP packets and mechanisms. These packets are encapsulated in a link layer unnumbered acknowledgment 'null' signalling message that contains the remote stations unique address and are transmitted on the outbound TDM (see procedure 32 in FIG. 9).

In the case where the central stations local copy of the channel availability table indicates that the selected channel is not available the central station silently discards the received resource notification (see procedure 45 in FIG. 10) and any associated PPP request packets.

In the case where the remote station does not receive an unnumbered acknowledgment prior to the expiry of a configurable timer (see procedure 33 FIG. 9) the remote station waits until it receives an updated 'resource map' and a randomised automatic retry timer expires (see 29 and 25 in FIG. 9) prior to repeating the attempt. In the preferred embodiment the values of all timers, the ranges over which any timer shall be randomised and the maximum number of consecutive automatic retry attempts can be configured by the central station using link layer configuration tables.

When all remote station data sessions are completed (e.g. all PPP sessions have been terminated using the standard PPP Link Control Protocol procedures) the remote station releases the radio network resource that it was using to support the carriage of data packets between the remote station and central station, thus making these resources available to other remote stations within the resource domain. In order to release a radio resource the remote station simply sends a resource release notify (see procedure 57 in FIG. 9) to the central station.

Upon receipt of a resource release notify (see 59 in FIG. 10) the central station updates the channel availability table specific to the resource domain effected and sends a 'delete route' primitive (see procedure 60 in FIG. 10) to the multiplexing device 117 thus removing the routing context. The updated channel availability table is broadcast on the outbound TDM channel either at the next scheduled broadcast time or as the result of a channel selection by some other remote station operating in the same resource domain.

APPENDIX F

Exemplary End to End Packet Transmission

In the preferred arrangement the network provides an IP data transfer service for the transport of user data or voice packets between the remote stations 119, 1808, 1803 and 1809 and the central station 104. The transport mechanism provides what is effectively a transparent satellite transport service to IP based applications.

Inbound Packets

An IP packet containing either voice or data information originating at the remote station 119 is encapsulated within a standard PPP packet by the embedded router function 121 and passed to the link layer process. Packet fragmentation, and reassembly if required is performed in the router function using MLPPP.

The PPP frame received from the embedded router 121 is encapsulated within a link layer message. This message contains the link layer address of the remote station 119 and the link layer session ID. The address is used by the multiplexing function to route the packets to the appropriate PPPoE session at the central station 104, and the link layer session ID is used to discriminate real time data to facilitate the provision of low jitter and latency quality of service for real time data (e.g. voice). The resulting link layer message is modulated and transmitted across the inbound satellite link.

Upon receipt of the link layer message at the central station 104 the central station link layer process removes the link layer encapsulation from the received packet and using the unique remote station ID and link layer session ID routes the packet to the appropriate PPPoE entity. The received packet is encapsulated within a PPPoE frame and passed to the central station router 111 via an Ethernet connection. At the central station router 111 the PPPoE and PPP encapsulations are removed and the IP packet sent from the remote station 119 is recovered and may be routed to the requested destination using standard IP routing processes.

Outbound Packets

An IP packet containing either voice or data information originating at the central station 104 is encapsulated within a standard PPP packet by the central station router function 111 and passed to the link layer process. Packet fragmentation, and reassembly if required is performed in the central station router 111 using MLPPP.

The PPP frame is further encapsulated within a PPPoE packet and forwarded to the multiplexing unit 107 via an Ethernet connection. At the multiplexing unit the PPPoE session ID is used to determine the link layer unique remote station ID and Session ID, the PPPoE packet is then encapsulated within a link layer message. The resulting link layer message is forwarded to the outbound TDM channel unit, modulated and transmitted across the outbound satellite link 101.

Upon receipt of the link layer message at the remote station 119 the remote station link layer process removes the link layer encapsulation from, the received packet and routes the packet to the embedded router function 121. At the remote station router 121 the PPP encapsulation is removed and the IP packet sent from the central station 104 is recovered and may be routed to either the DTE device or IP telephony device using standard IP routing processes.

The invention claimed is:

1. A method of establishing a radio connection for satellite communications in a system that comprises remote stations coupled to a central station by a satellite network, wherein different remote stations are located in different geographic areas, the method being performed by a remote station in a geographic area and comprising:

receiving, from the central station, information about available satellite network resources for one or more geographic areas;

identifying satellite resources needed to establish the radio connection, wherein identifying comprises:
  determining a current geographic position of the remote station;
  referencing a database of geographic areas using the geographic position to identify the geographic area with which the remote station is associated; and
  referencing the information using the geographic area to establish which satellite network resources are available to the remote station;

seizing satellite network resources needed to establish the radio connection; and receiving, from the central station, an updated version of the information that has been updated to reflect seizing of the satellite network resources.

2. The method of claim 1, wherein the information is published by the central station for receipt by the remote station.

3. The method of claim 1, wherein the information about available network resources comprises identification of outbound and inbound channels, availability of channel capacity, and energy density of channels in the geographic areas.

4. The method of claim 1, wherein a size of at least one of the geographic areas changes; and
  wherein receiving the information comprises receiving, from the central station, amended information about available network resources that reflects a change in the size of the at least one of the geographic areas.

5. The method of claim 1, wherein the database of geographic areas is stored on the remote station when the remote station is manufactured.

6. The method of claim 1, wherein the remote station receives the database of geographic areas before it is determined to establish the connection.

7. The method of claim 1, wherein the remote station receives the database of geographic areas after it is determined to establish the radio connection.

8. The method of claim 1, wherein the information is received using one of CDMA and TDMA modulation.

9. The method of claim 1, wherein the satellite communication system comprises:
  remote stations coupled to central stations via one or more satellites, wherein the remote station is configured to switch between operation with the central station and any other said central station for which the remote station can receive incoming communications.

10. The method of claim 1, wherein:
the information is divided into at least one of static and dynamic information; and
an updated version of the information comprising static information is received less frequently than an updated version of the information comprising dynamic information.

11. The method of claim 10, wherein the static information comprises, in regard to inbound and outbound channels that are allocated for use in a resource domain, at least one of frequency, timeslot, code sequence, turbo-coding rate, modulation type, and Grade of Service.

12. The method of claim 10, wherein the dynamic information comprises information regarding a current status of a channel including at least one of channel free, channel busy, and channel unavailable.

13. The method of claim 1, wherein the updated version of the information indicates a success, or otherwise, of the seizing of the satellite network resources, thereby also indicating whether any collision occurred between a seizure from the remote station and another seizure from another remote station.

14. The method of claim 13, wherein:
the satellite network resources needed to establish the connection comprises identifying an inbound CDMA channel characterized by a frequency and a code.

15. A remote station configured to establish a radio connection in a satellite communication system that comprises remote stations coupled to a central station by a satellite network, wherein different remote stations are located in different geographic areas, the remote station being in a geographic area, the remote station comprising circuitry to:
receive, from the central station, information about available satellite network resources for one or more geographic areas;
identify satellite network resources needed to establish the radio connection, wherein identifying comprises:
determining a current geographic position of the remote station;
referencing a database of geographic areas using the geographic position to identify the geographic area with which the remote station is associated; and
referencing the information using the geographic area to establish which satellite network resources are available to the remote station;
seize the satellite network resources needed to establish the radio connection; and
receive, from the central station, an updated version of the information that has been updated to reflect seizing of the satellite network resources.

16. The remote station of claim 15, wherein the information is published by the central station for receipt by the remote station.

17. The remote station of claim 15, wherein the information about available satellite network resources comprises identification of outbound and inbound channels, availability of channel capacity, and energy density of channels in the geographic areas.

18. The remote station of claim 15, wherein a size of at least one of the geographic areas has changed; and
wherein receiving the information comprises receiving, from the central station, amended information about available network resources that reflects a change in the size of the at least one of the geographic areas.

19. The remote station of claim 15, wherein the database of geographic areas is stored on the remote station when the remote station is manufactured.

20. The remote station of claim 15, wherein the remote station is configured to receive the database of geographic areas before it is determined to establish the radio connection.

21. The remote station of claim 15, wherein the remote station is configured to receive the database of geographic areas after it is determined to establish the radio connection.

22. The remote station of claim 15, wherein the information is received using one of code division multiple access (CDMA) and time division multiple access (TDMA) modulation.

23. The remote station of claim 15, wherein the satellite communication system comprises:
remote stations coupled to central stations via one or more satellites; and
wherein the remote station is configured to switch between operation with the central station and any other central station for which the remote station can receive incoming communications.

24. The remote station of claim 15, wherein:
the information comprises at least one of static and dynamic information; and
an updated version of the information comprising static information is received less frequently than an updated version of the list of information comprising dynamic information.

25. The remote station of claim 24, wherein the static information comprises, in regard to inbound and outbound channels that are allocated for use in a resource domain, at least one of frequency, timeslot, code sequence, turbo-coding rate, modulation type, and Grade of Service.

26. The remote station of claim 24, wherein the dynamic information comprises information regarding a current status of a channel including at least one of channel free, channel busy, and channel unavailable.

27. The remote station of claim 15, further comprising circuitry to:
receive, from the central station, an acknowledgment indicating no collision between a notification sent from the remote station and another notification sent from another remote station;
wherein seizing is performed following receipt of the acknowledgment.

28. The remote station of claim 27, wherein:
identifying the satellite network resources needed to establish the radio connection comprises identifying an inbound code division multiple access (CDMA) channel characterized by a frequency and a code; and
the acknowledgment comprises a PPP acknowledgment.

* * * * *